US006957339B2

(12) United States Patent
Shinzaki

(10) Patent No.: US 6,957,339 B2
(45) Date of Patent: Oct. 18, 2005

(54) USER VERIFICATION SYSTEM, AND PORTABLE ELECTRONIC DEVICE WITH USER VERIFICATION FUNCTION UTILIZING BIOMETRIC INFORMATION

(75) Inventor: Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/163,531

(22) Filed: Jun. 7, 2002

(65) Prior Publication Data

US 2003/0005310 A1 Jan. 2, 2003

Related U.S. Application Data

(63) Continuation of application No. PCT/JP99/06961, filed on Dec. 10, 1999.

(51) Int. Cl.$^7$ .............. H04K 1/00; G06F 11/30; G06F 12/14; H04L 9/32; H04L 9/00
(52) U.S. Cl. ............... 713/186; 713/182; 713/184; 713/202
(58) Field of Search .................... 713/182, 184, 713/186, 202, 185

(56) References Cited

U.S. PATENT DOCUMENTS

| | | | | |
|---|---|---|---|---|
| 5,280,527 A | * | 1/1994 | Gullman et al. | 713/184 |
| 5,386,104 A | * | 1/1995 | Sime | 235/379 |
| 5,917,913 A | * | 6/1999 | Wang | 705/67 |
| 6,011,858 A | * | 1/2000 | Stock et al. | 382/115 |
| 6,038,666 A | * | 3/2000 | Hsu et al. | 713/186 |
| 6,044,349 A | * | 3/2000 | Tolopka et al. | 705/1 |
| 6,104,809 A | * | 8/2000 | Berson et al. | 713/186 |
| 6,168,077 B1 | * | 1/2001 | Gray et al. | 235/375 |
| 6,175,922 B1 | * | 1/2001 | Wang | 713/182 |

(Continued)

FOREIGN PATENT DOCUMENTS

| | | |
|---|---|---|
| EP | 0 864 996 A2 | 9/1998 |
| JP | A 2-40781 | 2/1990 |
| JP | 6-176220 | 6/1994 |
| JP | 7-306924 | 11/1995 |
| JP | 9-297825 | 11/1997 |
| JP | 11-7507 | 1/1999 |
| JP | 11-143833 | 5/1999 |

OTHER PUBLICATIONS

Isobe, Yoshiaki, et al., "A Proposal for Authentication System using a Smart card with Fingerprints," Hitachi, Ltd. Systems Development Laboratory, Research Report, Information Processing Society of Japan (IPSJ), pp. 55–60, Mar. 3, 1999, vol. 99, No. 24, in Japanese with English Abstract, with copy of English translation of entire article.

*Primary Examiner*—Avaz Sheikh
*Assistant Examiner*—Christian La Forgia
(74) *Attorney, Agent, or Firm*—Staas & Halsey LLP

(57) ABSTRACT

In a system (e.g., debit card) where a PIN is entered as verification, the PIN and biometric information, which is free of being stolen or faked, are combined to realize secure user verification. The leakage and the theft of a PIN is reliably prevented, thereby realizing a high security ability. To-be-verified biometric feature data is transmitted from first transceiving interface (205) of data processing device (200) to portable electronic device (300). Biometric feature data verifying section (306) of portable electronic device (300) compares the to-be-verified biometric feature data, which has been received by second transceiving interface (301), with valid biometric feature data. If a predetermined matching condition between the to-be-verified biometric feature data and the valid biometric feature data is satisfied, a PIN stored in portable electronic device (300) is transmitted from second transceiving interface (301) to management device (400) via first transceiving interface (205) of data processing device (200).

32 Claims, 16 Drawing Sheets

U.S. PATENT DOCUMENTS

| | | | | |
|---|---|---|---|---|
| 6,282,656 B1 | * | 8/2001 | Wang | 713/201 |
| 6,317,834 B1 | * | 11/2001 | Gennaro et al. | 713/186 |
| 6,330,674 B1 | * | 12/2001 | Angelo et al. | 713/186 |
| 6,367,016 B1 | * | 4/2002 | Lambert et al. | 713/185 |
| 6,460,138 B1 | * | 10/2002 | Morris | 713/184 |
| 6,484,260 B1 | * | 11/2002 | Scott et al. | 713/186 |
| 6,484,936 B1 | * | 11/2002 | Nicoll et al. | 235/379 |
| 6,487,662 B1 | * | 11/2002 | Kharon et al. | 713/186 |
| 6,535,978 B1 | * | 3/2003 | Padgett et al. | 713/156 |
| 6,539,101 B1 | * | 3/2003 | Black | 382/124 |
| 6,583,864 B1 | * | 6/2003 | Stanners | 356/71 |
| 6,594,759 B1 | * | 7/2003 | Wang | 713/182 |
| 6,615,351 B1 | * | 9/2003 | Sedlak et al. | 713/172 |
| 6,662,166 B2 | * | 12/2003 | Pare et al. | 705/39 |
| 6,721,891 B1 | * | 4/2004 | Borza | 713/202 |
| 2002/0129285 A1 | * | 9/2002 | Kuwata et al. | 713/202 |

* cited by examiner

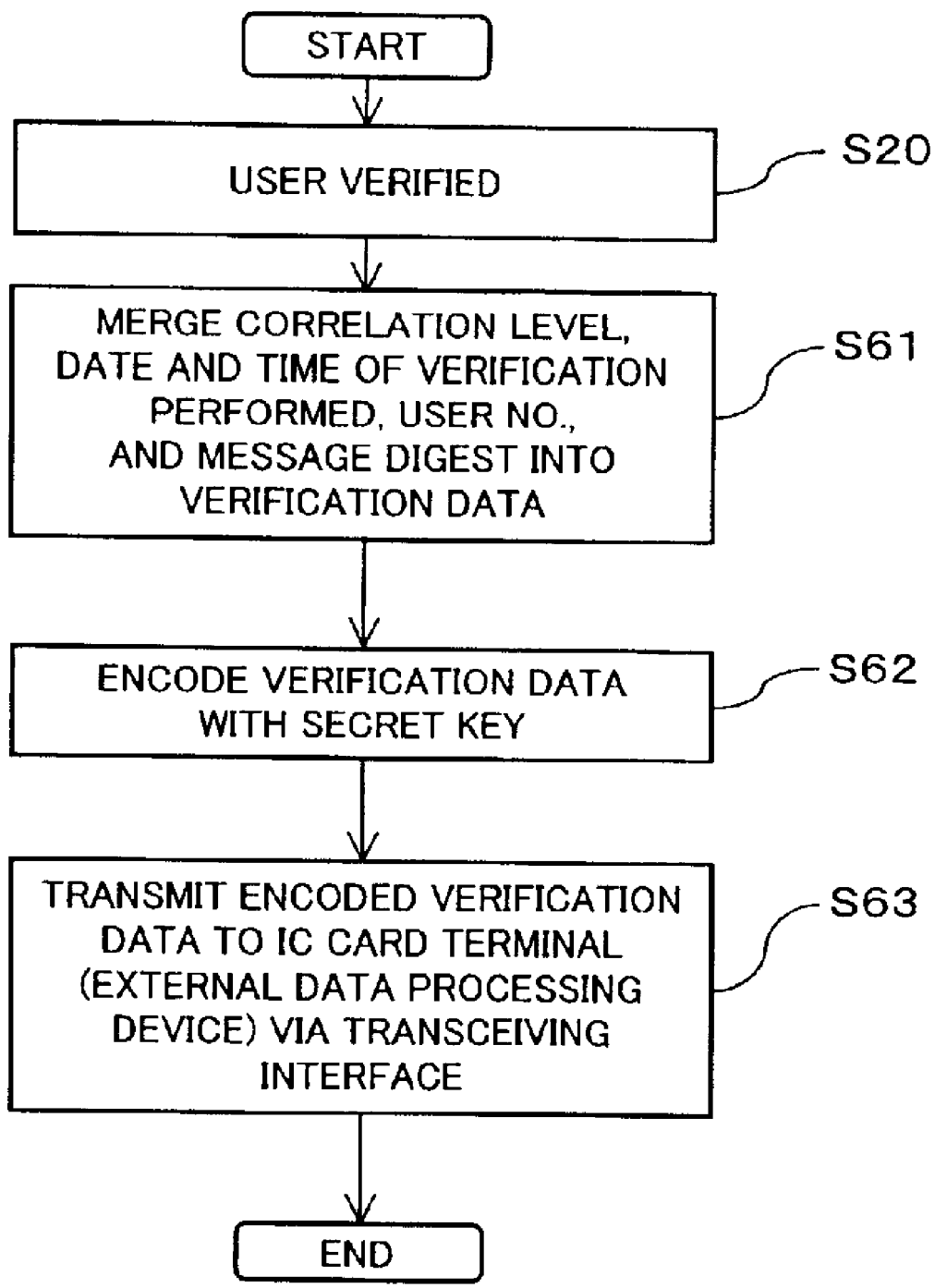

USER VERIFICATION SYSTEM, AND PORTABLE ELECTRONIC DEVICE WITH USER VERIFICATION FUNCTION UTILIZING BIOMETRIC INFORMATION

This application is a continuation of PCT/JP99/06961 filed on Dec. 10, 1999.

FIELD OF THE INVENTION

The present invention relates to a portable electronic device, such as an IC (Integrated Circuit) card, having a function for verifying a user utilizing biometric information (for example, fingerprints, voice, iris patterns, facial patterns, retina patterns, blood vessel patterns, hand shapes, signatures, keystrokes, signature dynamics, and so on).

Electronic commerce using portable electronic devices, such as IC cards, promises to flourish in the near future, and to accompany this, tamper-resistant (tamperproof) IC cards are already in use. However, user verification still has a problem of poor security. A password (personal identification number; PIN) is requested as verification, and there is a danger of "spoofing" or "identity fraud" if the password is stolen.

In particular, when debit cards are used at merchant locations, users are requested to directly input 4-digit PINs through a keypad. Since such places are poor in security in comparison with financial institution, there is a high risk that PINs maybe stolen at merchant locations and afterward used fraudulently.

Therefore, it is expected that biometric information, such as fingerprints and iris patterns, will be employed, in association with encryption and a public key {PKI (Public Key Identification)} system, in user verification for IC cards and debit cards.

Here, a debit card denotes a magnetic bankcard which is issued by a financial institution, and which can be used to shop at merchant locations. The purchase amount is deducted automatically from the cardholder's bank account.

BACKGROUND OF THE INVENTION

Until now, electronic commerce utilizing IC cards and debit cards have assumed user verification associated with a PKI system. In most cases an IC card or a debit card is used, however, a user is verified with a password (PIN), and there is thus a danger of fraudulent use (spoofing or identity fraud) as in the case of a conventional bankcard.

More precisely, users who are not accustomed to using a password tend to choose easy-to-remember strings of characters or digits as passwords or PINs; for example, the user's or a family member's name or birthday, telephone number, favorite word, etc. Passwords or PINs can easily be leaked or stolen, if they are noted down, or if they are "shoulder surfed"—someone watches you from a nearby location as you punch in your password through a ten-key pad— at the time debit cards are used at merchandise locations.

Such identity theft commonly occurs, which is evident from the frequency of cases in which money is easily stolen from a victim's accounts by using a stolen bankcard. This proves that user verification with a password is insufficient in for security purposes.

Employing passwords in user verification simplifies systems and reduces manufacturing costs, but the user should be security-conscious. For example, a password should not be the user's or a family member's name or birthday, telephone number, or favorite word. Taking a note of a password should of course be prohibited. Further, the user must always be cautious about the theft of a password whenever he uses that password, because third parties can read passwords from the movement of a user's fingers while he is punching in his password.

Further, as in the case of a password, the user must be careful with an encryption key. Generally speaking, memorizing an encryption/decryption key is troublesome because its character string is exceedingly long. Hence, the key is normally stored in a computer or in a flexible disc, and it is read therefrom as necessary. At the time the key is read out, a password is often used to retain the security of the key. At that time, a short, easy-to-memorize character string should not be used because a lengthy character string is difficult to memorize. Such a short character string will significantly diminish the security of the key.

The forgoing problems are found also in IC cards and debit cards. No matter how the tamper-resistant properties of IC cards are improved to protect the encryption key (secret key) stored therein from theft, all the efforts come to nothing without the users' awareness of the security of passwords.

Hence, in electronic commerce utilizing IC cards or debit cards, it is required to combine the PIN verification with biometric user verification (for example, fingerprints, voice, iris patterns, facial patterns, retina patterns, blood vessel patterns, hand shapes, signatures, keystrokes, signature dynamics, and so on), in which user-independent security setting is realized.

Biometric information utilizes characteristics of the human body that are unique to a user. It avoids the necessity of memorizing or writing down passwords, and it cannot be surmised by third parties. Further, biometric information utilizes difficult to counterfeit, and thus, even if a user is watched as he is undergoing biometric verification, it is impossible to fake the biometric information. Hence, biometric user verification is the optimum choice in a case where user verification is of great importance.

A debit card is a bankcard that can be used to shop at merchandise locations. Thus, if a password (PIN) for a debit card is stolen, a lot of harm will be caused. For this reason, in a system (for example, debit cards) where a PIN is requested as verification, it is strongly expected that the input of a PIN will be associated with biometric user verification.

On the other hand, with recent increases in the storage capacity of IC cards, it is now possible to store/register from hundreds of bytes to 2 kilobytes of biometric feature data in an IC card. A small-sized processor (CPU) built in an IC card allows the IC card to serve as a data processor.

Existing processors for IC cards, however, do not have the ability to execute all the processing of biometric feature data. Thus, an IC card terminal (external data processing device) for accessing IC cards samples an object user's biometric information, and it also extracts therefrom biometric feature data (hereinafter called "to-be-verified biometric feature data") for use in user verification, and IC cards are devoted to the verification of the extracted biometric feature data (for example, see Japanese Patent Application Publication No. HEI 10-312459). More precisely, an IC card previously stores its authorized user's biometric feature data as valid biometric feature data. Upon receipt of to-be-verified biometric feature data from the IC card terminal, the IC card compares the to-be-verified biometric feature data with the valid biometric feature data, and then returns the comparison/verification result to the IC card terminal.

Applying the relationship between the IC card and the IC card terminal to a client-server fingerprint verification method, the IC card terminal corresponds to a client which extracts fingerprint features, and the IC card corresponds to a server which verifies the fingerprint feature data. The foregoing verification method using an IC card, however, differs from the client-server fingerprint verification method in that, in the former method, the IC card, which meets the server of the latter method, is carried by a user as a highly tamper-resistant portable electronic device. Since biometric feature data verification and its subsequent processing are executed on the IC card which is carried by a user, not on a server which is managed by a third party, the former offers an advantage of ensuring user privacy.

However, the foregoing combination between biometric information and an IC card still has problems to be solved. The problems are that to-be-verified biometric feature data is sent, as it is, from the IC card terminal to the IC card, and that a verification result is sent out from the IC card as an OK/NG signal (0/1 signal). As a result, no matter how the IC card is superior in tamper-resistant properties, there still remains the possibility that the data transmitted/received between the IC card and the IC card terminal may be wrongfully obtained and used by third parties. In other words, the existing combination between an IC card and biometric information has not taken full advantage of the high tamper-resistant property of a recent IC card.

Accordingly, it has been expected that high security ability will be guaranteed when to-be-verified biometric feature data is input to an IC card, and also when a verification result obtained within an IC card is sent out to an external apparatus.

With the foregoing problems in view, one object of the present invention is to realize secure user verification. The present invention is applied to a system (for example, debit cards) where the input of a PIN is requested as verification, making it possible to use PIN verification in association with biometric feature data, which is free of having been stolen or faked. The leakage and theft of the PIN are thus reliably prevented, so that a high level of security can be guaranteed.

Another object of the invention is to guarantee high security ability when to-be-verified biometric feature data is input to portable electronic device, such as an IC card, and also when a verification result obtained within an IC card is sent out to an external apparatus, so that secure user verification is realized.

DISCLOSURE OF THE INVENTION (1-1) In order to accomplish the above object, according to the present invention, there is provided a user verification system, comprising: a portable electronic device, which is adapted to be carried by a user; a data processing device for directly accessing such portable electronic device which is temporarily installed therein; and a management device which accesses the portable electronic device via the data processing device and verifies the user utilizing a personal identification number (PIN).

The data processing device includes: a biometric information measuring unit for measuring biometric information of the user; a biometric feature data extracting section for extracting to-be-verified biometric feature data from the biometric information, which has been measured by biometric information measuring unit; and a first transceiving interface for transmitting/receiving data to/from the portable electronic device and the management device.

The portable electronic device includes: a biometric feature data register section having pre-stored valid biometric feature data of an authorized user of the portable electronic device; a second transceiving interface for transmitting/receiving data to/from the data processing device; a biometric feature data verifying section for comparing to-be-verified biometric feature data, which is received from an external device via the second transceiving interface, with the valid biometric feature data; and a PIN register section having a pre-stored PIN of the authorized user of the portable electronic device.

The to-be-verified biometric feature data is transmitted from the first transceiving interface of the data processing device to the portable electronic device, and the biometric feature data verifying section of the portable electronic device compares the to-be-verified biometric feature data, which has been received via the second transceiving interface, with the valid biometric feature data. As the result of the comparison, if the to-be-verified biometric feature data matches the valid biometric feature data in terms of a predetermined matching condition, the PIN is transmitted from the second transceiving interface of the portable electronic device to the management device via the first transceiving interface of the data processing device.

(1-2) The data processing device further includes a first encryption section for encoding the to-be-verified biometric feature data with a public key, and the portable electronic device further includes: a secret key register section having a pre-stored valid secret key corresponding to the public key; and a decryption section for decoding encoded data, which is received from an external device via the second transceiving interface, with the valid secret key. The to-be-verified biometric feature data encoded by the first encryption section is transmitted from the first transceiving interface to the portable electronic device, as the aforementioned encoded data, and the decryption section decodes the encoded data, which has been received via the second transceiving interface, into the original to-be-verified biometric feature data, which is then compared with the valid biometric feature data by the biometric feature data verifying section.

(1-3) The portable electronic device further includes: a made-for-management-device public key register section having a pre-stored public key dedicated to the management device; and a second encryption section for encoding the PIN with the made-for-management-device public key before the PIN is sent out to the management device.

(1-4) The portable electronic device further includes a recording unit provided on its surface, which recording unit stores magnetic data of information for use in processing carried out by the management device. The data processing device further includes a magnetic data read-out unit for reading out the magnetic data stored in the recording unit, and the magnetic data, which has been readout by the magnetic data read-out unit, is sent out, together with the PIN, from the first transceiving interface to the management device.

(1-5) The data processing device further includes a time stamp generating section for generating a time stamp as the date and time when the biometric feature data extracting section has extracted the to-be-verified biometric feature data. The time stamp is encoded, together with the to-be-verified biometric feature data, by the first encryption section, and the encoded time stamp is then sent out from the first transceiving interface to the portable electronic device. The portable electronic device further includes: a clock function section for calculating the current time; and a time stamp verifying section for comparing the original time stamp, which has been restored by the decryption section, with the current time, which has been calculated by the clock function section. If it is found, as the comparison result by the biometric feature data verifying section, that the to-be-verified biometric feature data matches the valid biometric feature data in terms of a predetermined matching condition, and also if it is found, as the comparison result by the time stamp verifying section, that a difference between the time stamp and the current time falls within a predetermined range, the user is identified as the authorized user of the portable electronic device.

(1-6) If the user is identified as the authorized user of the portable electronic device, as the comparison result by the biometric feature data verifying section and the time stamp verifying section, the second encryption section encodes both the PIN and the date and time the comparison was performed, which date and time is obtained by the clock function section, and the encoded PIN and the encoded date and time of the comparison are then sent out from the second transceiving interface of the portable electronic device to an external apparatus.

(1-7) Upon receipt of a predetermined signal via the second transceiving interface, the portable electronic device transmits public key information of the authorized user, which public key information is registered in the portable electronic device, from the second transceiving interface to an external device.

(1-8) The user verification system further comprises a lock function section which is operable to prohibit input of biometric feature information to the portable electronic device, if the evaluation is made a predetermined number of times successively, as a result of the comparison by the feature data verifying section of the portable electronic device, that the to-be-verified biometric feature data never matches the valid biometric feature data in terms of the predetermined matching condition.

(1-9) The portable electronic device further includes a management log recording section storing a management log of the PIN, which management log accumulates the dates and times when the PIN has been transmitted, or the descriptions of transactions performed, or both of these.

In the user verification system of the above item (1-1), the biometric information measuring unit measures biometric information of an object user to be verified, and the biometric feature data extracting section extracts to-be-verified biometric feature data from the biometric information. These processes are performed in the data processing device, and the thus obtained to-be-verified biometric feature data is then transmitted from the first transceiving interface to the portable electronic device. In the portable electronic device, upon receipt of the to-be-verified biometric feature data via the second transceiving interface, biometric feature data verifying section compares/verifies the to-be-verified biometric feature data with valid biometric feature data. As the result of the comparison, if the to-be-verified biometric feature data satisfies a predetermined matching condition with the valid biometric feature data, a PIN is transmitted to the management device.

As aforementioned, according to the user verification system of the item (1-1), after a predetermined matching between the to-be-verified biometric feature data and the valid biometric feature data is confirmed, the PIN stored in the portable electronic device is transmitted to the management device. Thus, it is no longer necessary to directly input a PIN to the data processing device with a ten-key pad, and the PIN only passes through the data processing device, so that the risk of a PIN being stolen at its input can be minimized. Accordingly, with the present invention applied to a system (for example, debit cards) where a PIN is requested to be input as verification, it is possible to associate PIN verification with biometric user verification using biometric feature data, which is free of being stolen or faked. The leakage and the theft of PINs are thus prevented with reliability, so that a high level of security can be guaranteed, thereby realizing secure user verification.

According to the user verification system of the foregoing item (1-2), the first encryption section of the data processing device encodes the to-be-verified biometric feature data using a public key, and the encoded data is transmitted to the portable electronic device. Upon receipt of the encoded data, the decryption section of the portable electronic device decodes the data with a valid secret key to restore the original to-be-verified biometric feature data, and the biometric feature data verifying section performs comparison/verification. That is, the to-be-verified biometric feature data is encoded by a public key system before it is sent out from the data processing device to the portable device, and all the data that was entered in the portable electronic device for user verification is decoded in the portable electronic device. It is thus possible to prevent the inputting of any tampered to-be-verified biometric feature data, making it difficult for wicked persons to commit spoofing or identity fraud, so that a high level of security is guaranteed. Further, even if the to-be-verified biometric feature data should be intercepted using a false portable electronic device (a false IC card, or the like), it is still difficult to wrongfully use such stolen biometric feature data in another system because the stolen biometric feature data is encoded data. Accordingly, a high level of security is guaranteed, and user verification can be performed with secure.

According to the user verification system of the foregoing item (1-3), all the data transmitted from the portable device to an external apparatus is encoded in the portable electronic device. More precisely, the second encryption section encodes a PIN using a public key for the management device before the PIN is transmitted from the portable electronic device to the management device. Accordingly, even if a PIN should be intercepted during its transmission from the portable device to an external apparatus, it is still difficult to falsely use the stolen PIN in another system because the thus wrongfully obtained PIN has been encoded, so that a higher level of security is guaranteed.

According to the user verification system of the foregoing item (1-4), the magnetic data read-out unit reads out the information stored in the recording unit provided on the surface of the portable electronic device, and the read-out information is transmitted to the management device along with a PIN. Accordingly, the user verification system of the forgoing item (1-4) is applicable in a case where a type of IC card having a function (magnetic stripes) of an existing magnetic card serves as a portable electronic device.

According to the user verification system of the foregoing item (1-5), in the data processing device, a time stamp is generated as the date and time the to-be-verified biometric feature data was extracted, and the generated time stamp is attached to the to-be-verified biometric feature data, and is then transmitted to the portable electronic device. In the portable electronic device, the user is authenticated if a predetermined matching condition is satisfied between the to-be-verified biometric feature data and valid biometric feature data, and also if the difference between the time stamp (the extraction date-and-time) and the current time falls within a predetermined range. Accordingly, even if to-be-verified biometric feature data should be intercepted during its transmission from the date processing device to the portable electronic device, and even if the stolen feature data should be falsely used in a replay attack against the portable device, the difference between the time stamp (the extraction date-and-time) and the current time becomes significant. On the basis of such significant difference, it is possible to reject access attempts using such stolen to-be-verified biometric feature data, so that the security level of the system is significantly improved.

According to the user verification system of the forgoing item (1-6), in the portable electronic device, if an object user is identified as the owner of the portable device, the PIN, together with the verification date-and-time (time stamp) obtained by the clock function section, is encoded by the second encryption section, and is then sent out to the management device. Thus, even if the PIN should be intercepted during its transmission from the portable device to the management device and then be wrongfully used, the management device, which monitors the verification date-and-time attached to the PIN, can recognize that a wrongfully obtained PIN is used, based on the difference between the verification date-and-time (time stamp) and the current time. Accordingly, it is possible to reject access attempts using such a stolen PIN, so that the security level of the system is significantly improved.

According to the user verification system of the forgoing item (1-7), when the portable electronic device receives a predetermined signal via the second transceiving interface, the authorized user's public key information stored in the portable electronic device is sent out to an external apparatus. It is thus possible for the data processing device to use the public key stored in the portable electronic device, without the necessity for the data processing device itself to hold a pre-stored public key.

According to the user verification system of the forgoing item (1-8), if the biometric feature data verifying section obtains the comparison result a predetermined times consecutively that the matching requirements between the to-be-verified biometric feature data and the valid biometric feature data are not satisfied, the lock function section locks the portable electronic device to prohibit the inputting of biometric feature data to the portable electronic device, thereby preventing unauthorized accessing with reliability.

According to the user verification system of the forgoing item (1-9), the management log recording section stores the date and time the PIN was sent out, or the content of the transaction performed, or the both of these. It is thus possible for the authorized user of the portable electronic device to keep a management log for himself, separate from the one made for the system. Such a user's log will serve as a safeguard against a low-reliability system.

(2-1) A portable electronic device of the present invention receives/transmits data from/to a management device that uses a personal identification number (PIN) to verify a user. The portable electronic device comprises: a biometric feature data register section having pre-stored valid biometric feature data of an authorized user of the portable electronic device; a transceiving interface for transmitting/receiving data to/from an external device; a biometric feature data verifying section for comparing to-be-verified biometric feature data, which is received from an external device via the transceiving interface, with the valid biometric feature data; and a PIN register section having a pre-stored PIN of the authorized user of the portable electronic device. The biometric feature data verifying section compares the to-be-verified biometric feature data, which has been received via the transceiving interface, with the valid biometric feature data. As the result of the comparison, if the to-be-verified biometric feature data matches the valid biometric feature data in terms of a predetermined matching condition, the PIN is transmitted from the transceiving interface to the management device.

(2-2) The portable electronic device further comprises: a secret key register section having a pre-stored valid secret key corresponding to the public key; and a decryption section for decoding encoded data, which is received from an external device via the second transceiving interface, with the valid secret key. The decryption section decodes the encoded data, which has been received via the transceiving interface, into the original to-be-verified biometric feature data, and the biometric feature data verifying section compares the original to-be-verified biometric feature data, which has been restored by the decryption section, with valid biometric feature data.

(2-3) The portable electronic device further comprises: a made-for-management-device public key register section having a pre-stored public key dedicated to the management device; and an encryption section for encoding the PIN with the made-for-management-device public key before the PIN is sent out to the management device.

(2-4) The portable electronic device further comprises a recording unit provided on its surface, which recording unit stores magnetic data of information for use in processing which is carried out by the management device.

(2-5) The portable electronic device further comprises: a clock function section for calculating the current time; and a time stamp verifying section for comparing a time stamp, if any, attached to the original to-be-verified biometric feature data restored by the decryption section, with the current time, which has been calculated by the clock function section. The time stamp indicates the date and time when the to-be-verified biometric feature data was extracted. If it is found, as the comparison result by the biometric feature data verifying section, that the to-be-verified biometric feature data matches the valid biometric feature data in terms of a predetermined matching condition, and also if it is found, as the comparison result by the time stamp verifying section, that a difference between the time stamp and the current time falls within a predetermined range, the user is identified as the authorized user of the portable electronic device.

(2-6) If the user is identified as the authorized user of the portable electronic device, as the comparison result by the biometric feature data verifying section and the time stamp verifying section, the encryption section encodes both the PIN and the date and time the comparison was performed, which date and time is obtained by the clock function section, and the encoded PIN and the encoded comparison date-and-time are then sent out from the transceiving interface to an external apparatus.

(2-7) Upon receipt of a predetermined signal via the transceiving interface, the portable electronic device transmits the authorized user's public key information, which is registered in the portable electronic device, from the transceiving interface to an external device.

(2-8) The portable electronic device further comprises a lock function section which is operable to prohibit the input of biometric feature information to the portable electronic device, if the evaluation is made a predetermined number of times successively, as a result of the comparison by the feature data verifying section, that the to-be-verified biometric feature data never matches the valid biometric feature data in terms of the predetermined matching condition.

(2-9) The portable electronic device further comprises a management log recording section storing a management log of the PIN, which management log accumulates the dates and times when the PIN was transmitted, or the descriptions of transactions performed, or both of these.

According to the portable electronic device of the foregoing item (2-1) with a user verification function utilizing biometric information, upon receipt of the to-be-verified biometric feature data via the transceiving interface, biometric feature data verifying section compares/verifies the to-be-verified biometric feature data with valid biometric feature data. As the result of the comparison, if predetermined matching requirements between the to-be-verified biometric feature data and the valid biometric feature data are satisfied, a PIN is transmitted to the management device.

In this manner, according to the portable electronic device of the item (2-1), after a predetermined matching between the to-be-verified biometric feature data and the valid biometric feature data is confirmed, the PIN stored in the portable electronic device is transmitted to the management device. Thus, it is no longer necessary to directly input the PIN with a ten-key pad, so that the risk of a PIN being stolen at its input can be minimized. Accordingly, with the present invention applied to a system (for example, debit cards) where input of a PIN is requested as verification, it is possible to associate PIN verification with biometric user verification using biometric feature data, which is free of being stolen or faked. The leakage and the theft of the PIN are thus prevented with reliability, so that a high level of security can be guaranteed, thereby realizing secure user verification.

According to the portable electronic device of the foregoing item (2-2), after the decryption section restores the original to-be-verified biometric feature data using a valid secret key, the biometric feature data verification section carries out a comparison/verification operation. In other words, the to-be-verified biometric feature data is encoded by a public key system, and is then input to the portable electronic device. All the data that was input to the portable device at the user verification performed, is decoded in the portable electronic device. It is thus possible to prevent any counterfeit to-be-verified biometric feature data from being entered, making it difficult for wicked persons to commit spoofing or identity fraud, so that a high level of security is guaranteed. Further, even if the to-be-verified biometric feature data should be intercepted using a false portable electronic device (a false IC card, or the like), it is still difficult to wrongfully use such stolen biometric feature data in another system because the stolen biometric feature data is encoded data. Accordingly, a high level of security is guaranteed, and user verification can be performed with secure.

According to the portable electronic device of the item (2-3), all the data transmitted from the portable device to an external apparatus is encoded in the portable electronic device. More precisely, the encryption section encodes a PIN using a public key for the management device before the PIN is transmitted from the portable electronic device to the management device. Accordingly, even if a PIN should be intercepted during its transmission from the portable device to an external apparatus, it is still difficult to falsely use the stolen PIN in another system because the thus wrongfully obtained PIN has been encoded, so that a higher level of security is guaranteed.

According to the portable electronic device of the foregoing item (2-4), there is provided on the surface of the portable electronic device a recording unit storing magnetic data of the information which is for use in the processing made on the management device. Accordingly, the portable electronic device of the forgoing item (1-4) is applicable in a case where an IC card equipped with a function (magnetic stripes) of an existing magnetic card serves as a portable electronic device.

According to the portable electronic device of the foregoing item (2-5), as a result of the comparison by biometric feature data verification section, if the to-be-verified biometric feature data satisfies a predetermined matching condition with the valid biometric feature data, and also if the difference between the time stamp (the extraction date-and-time) and the current time falls within a predetermined range, the object person is judged to be the authorized user of the portable electronic device. Accordingly, even if the to-be-verified biometric feature data should be intercepted during its transmission to the portable electronic device, and even if the stolen feature data should be falsely used in a replay attack against the portable device, the difference between the time stamp (the extraction date-and-time) and the current time becomes significant. On the basis of such significant difference, it is possible to reject access attempts using such stolen to-be-verified biometric feature data, so that the security level of the system is significantly improved.

According to the portable electronic device of the foregoing item (2-6), after the object user is judged to be the authorized user of the portable electronic device, the PIN, together with the verification date-and-time (time stamp) obtained by the clock function section, is encoded by the encryption section, and is then transmitted to the management device. Thus, even if the PIN should be intercepted during its transmission from the portable device to the management device and then be wrongfully used, the management device, which monitors the verification date-and-time attached to the PIN, can recognize the use of the wrongfully obtained PIN, based on the difference between the verification date-and-time (time stamp) and the current time. Accordingly, it is possible to reject access attempts using such a stolen PIN, so that the security level of the system is significantly improved.

According to the user verification system of the forgoing item (2-7), when the portable electronic device receives a predetermined signal, the authorized user's valid public key information stored in the portable electronic device is sent out to an external apparatus. It is thus possible for the external apparatus to use the public key stored in the portable electronic device, without the necessity for the external apparatus itself to hold a pre-stored public key.

According to the user verification system of the forgoing item (2-8), if the biometric feature data verifying section obtains the comparison result a predetermined times consecutively that the matching condition between the to-be-verified biometric feature data and the valid biometric feature data is not satisfied, the lock function section locks the portable electronic device to prohibit the biometric feature data from being input to the portable electronic device, thereby preventing unauthorized accessing with reliability.

According to the user verification system of the forgoing item (2-9), the management log recording section has the date and time the PIN was sent out, or the content of the transaction performed, or the both of these. It is thus possible for the authorized user of the portable electronic device to keep a management log for himself, separate from the one that is made for the system. The user's log will serve as a safeguard against a low-reliability system.

(3-1) A user verification system of the present invention comprises: a portable electronic device, which is adapted to be carried by a user; and a data processing device for directly accessing such a portable electronic device which is temporarily installed therein.

The data processing device includes: a biometric information measuring unit for measuring biometric information of the user; a biometric feature data extracting section for extracting to-be-verified biometric feature data from the biometric information, which has been measured by biometric information measuring unit; a first encryption section for encoding the to-be-verified biometric feature data with a public key; and a first transceiving interface for transmitting/receiving data to/from the portable electronic device.

The portable electronic device includes: a biometric feature data register section having pre-stored valid biometric feature data of an authorized user of the portable electronic device; a second transceiving interface for transmitting/receiving data to/from the data processing device; a biometric feature data verifying section for comparing to-be-verified biometric feature data, which is received from an external device via the second transceiving interface, with the valid biometric feature data; a secret key register section having a pre-stored valid secret key corresponding to the public key; and a decryption section for decoding encoded data, which has been encoded with the public key, with the valid secret key.

The encoded to-be-verified biometric feature data, which has been encoded by the first encryption section, is transmitted from the first transceiving interface to the portable electronic device, and the decryption section decodes the encoded data, which has been received via the second transceiving interface, into the original to-be-verified biometric feature data, and the biometric feature data verifying section compares the original to-be-verified biometric feature data with the valid biometric feature data.

(3-2) The data processing device further includes a time stamp generating section for generating a time stamp as the date and time when the biometric feature data extracting section extracted the to-be-verified biometric feature data, and the time stamp is encoded, together with the to-be-verified biometric feature data, by the first encryption section, and the encoded time stamp is then sent out from the first transceiving interface to the portable electronic device.

The portable electronic device further includes: a clock function section for calculating the current time; and a time stamp verifying section for comparing the original time stamp, which has been restored by the decryption section, with the current time, which has been calculated by the clock function section. If it is found, as the comparison result by the biometric feature data verifying section, that the to-be-verified biometric feature data matches the valid biometric feature data in terms of a predetermined matching condition, and also if it is found, as the comparison result by the time stamp verifying section, that a difference between the time stamp and the current time falls within a predetermined range, the user is identified as the authorized user of the portable electronic device.

(3-3) The portable electronic device further includes: a user information register section having pre-stored user information about the authorized user of the portable electronic device; and a second encryption section for encoding data, which is to be transmitted from the second transceiving interface to the data processing device, with the valid secret key. As a result of comparison by the biometric feature data verifying section and the time stamp verifying section, if the user is identified as the authorized user of the portable electronic device, the second encryption section encodes at least one of the following items: the user information; the level of correlation between the to-be-verified biometric feature data and the valid biometric feature data, which correlation level is obtained at the comparison; and the date and time of the comparison performed, which is provided by the clock function section, and the encoded item is sent out from the second transceiving interface to the data processing device as a verification result.

(3-4) The data processing section further includes a message digest creating section for creating a message digest as a value obtained by inputting data to be transferred to the portable electronic device to a predetermined one-way function. The message digest and the to-be-verified biometric feature data are both encoded by the first encryption section, and are then sent out from the first transceiving interface to the portable electronic device. If the user is identified as the authorized user of the portable electronic device, as the comparison result by the biometric feature data verifying section and the time stamp verifying section, the second encryption section encodes the message digest which has been restored by the decryption section, and the encoded message digest is sent out from the second transceiving interface to the data processing device, as a verification result.

(3-5) The portable electronic device further includes a verification log recording section storing the verification result as a verification log for a predetermined time period.

(3-6) Upon receipt of a predetermined signal via the second transceiving interface, the portable electronic device transmits public key information of the authorized user, which public key information is registered in the portable electronic device, from the second transceiving interface to an external device.

(3-7) The user verification system further comprises a lock function section which is operable to prohibit input of biometric feature information to the portable electronic device, if the evaluation is made a predetermined number of times successively, as a result of the comparison by the feature data verifying section of the portable electronic device, that the to-be-verified biometric feature data never matches the valid biometric feature data in terms of the predetermined matching condition.

According to the user verification system of the foregoing item (3-1), in the data processing device, the biometric information measuring unit measures biometric information of an object user to be verified, and the biometric feature data extracting section extracts to-be-verified biometric feature data from the biometric information. The thus extracted to-be-verified biometric feature data is encoded by the first encryption section using a public key, and is then transmitted from the first transceiving interface to the portable electronic device. In the portable electronic device, upon receipt of the encoded data via the second transceiving interface, the decryption section restores the original to-be-verified biometric feature data, and then, the biometric feature data verifying section compares/verifies the to-be-verified biometric feature data with valid biometric feature data.

In this manner, according to the user verification system of the foregoing item (3-1), the to-be-verified biometric feature data is encoded using a public key before being transmitted from the data processing device to the portable electronic device. Thus, even if the to-be-verified biometric feature data should be intercepted using a false portable electronic device (a false IC card, or the like), it is still difficult to falsely use such encoded biometric feature data in another system. Thus, a high level of security is guaranteed, and user verification can be carried out with secure.

According to the user verification system of the foregoing item (3-2), in the data processing device, a time stamp is generated as the date and time the to-be-verified biometric feature data was extracted, and the generated time stamp is attached to the to-be-verified biometric feature data, and is then transmitted to the portable electronic device. In the portable electronic device, the user is authenticated if a predetermined matching condition is satisfied between the to-be-verified biometric feature data and the valid biometric feature data, and also if the difference between the time stamp (the extraction date-and-time) and the current time falls within a predetermined range. Accordingly, even if to-be-verified biometric feature data should be intercepted during its transmission from the data processing device to the portable electronic device, and even if the stolen feature data should be falsely used in a replay attack against the portable device, the difference between the time stamp (the extraction date-and-time) and the current time becomes significant. On the basis of such significant difference, it is possible to reject access attempts using such stolen to-be-verified biometric feature data, so that the security level of the system is significantly improved.

According to the user verification system of the foregoing item (3-3), in the portable electronic device, if the object person is judged to be the authorized user of the portable device, the second encryption section encodes at least one of the following items using a secret key: user information (e.g., account number); the level of correlation between the to-be-verified biometric feature data and the valid biometric feature data; and the verification date-and-time (time stamp). The encoded item is then sent out to the data processing device as a verification result. That is, since the information about the verification result is encoded using a secret key, the issuer of the verification result can be certified. At that time, since the verification date-and-time (time stamp) is inserted into the verification result, it is possible to prevent the verification result of the biometric feature data from being tempered or falsified. Hence, even when the result of the verification of the biometric feature data, obtained within the portable electronic device, is sent out to an external apparatus, a high level of security can still be guaranteed, thus realizing secure user verification. At that time, since the level of correlation between the to-be-verified biometric feature data and the valid biometric feature data is provided as a verification result, it is possible to manage the record of with what degree of certainty the user is verified.

According to the user verification system of the foregoing item (3-4), in the data processing device, a message digest about data which is transferred to the portable electronic device is created. The message digest and the to-be-verified biometric feature data are both encoded by the first encryption section, and are then sent out from the first transceiving interface to the portable electronic device. On the portable electronic device, if the user is identified as the authorized user of the portable electronic device, the message digest (e.g., an electronic bill), which has been restored by the decryption section, is encoded once again by the second encryption section with a secret key, and is sent to the data processing device as a verification result. Resulting from this, similar effects and benefits to those already described in the user verification system of the foregoing item (3-3) are guaranteed. Additionally, since a message digest is output as a verification result, it is possible to manage a record of which transaction the verification was made for.

According to the user verification system of the foregoing item (3-5), the verification log recording section of the portable electronic device stores the verification result, as a verification log, for a predetermined time period. That is, a record of user verification is stored in the portable electronic device.

According to the user verification system of the foregoing item (3-6), upon receipt of a predetermined signal via the second transceiving interface, the portable electronic device transmits the authorized user's public key information, registered in the portable electronic device, to an external device. It is thus possible for the data processing device to use the public key stored in the portable electronic device, without the necessity for the data processing device itself to hold a pre-stored public key.

According to the user verification system of the foregoing item (3-7), as a result of the comparison by the feature data verifying section of the portable electronic device, if the evaluation is made a predetermined number of times successively, that the predetermined matching condition between the to-be-verified biometric feature data and the valid biometric feature data is not satisfied, a lock function section prohibits the inputting of biometric feature information to the portable electronic device, so that any false access attempts can be reliably rejected.

(4-1) A portable electronic device of the present invention has a user verification function utilizing biometric information. The portable electronic device comprises: a biometric feature data register section having pre-stored valid biometric feature data of an authorized user of the portable electronic device; a transceiving interface for transmitting/receiving data to/from an external device; a biometric feature data verifying section for comparing to-be-verified biometric feature data, which is received from an external device via the transceiving interface, with the valid biometric feature data; a secret key register section having a pre-stored valid secret key corresponding to the public key; and a decryption section for decoding encoded data, which has been encoded with the public key, with the valid secret key. The decryption section decodes the encoded data, which has been received via the transceiving interface, into the original to-be-verified biometric feature data, and the biometric feature data verifying section compares the original to-be-verified biometric feature data with the valid biometric feature data.

(4-2) The portable electronic device further comprises: a clock function section for calculating the current time; and a time stamp verifying section for comparing a time stamp, if any, attached to the original to-be-verified biometric feature data restored by the decryption section, with the current time, which has been calculated by the clock function section. The time stamp indicates the date and time when the to-be-verified biometric feature data has been extracted. If it is found, as the comparison result by the biometric feature data verifying section, that the to-be-verified biometric feature data matches the valid biometric feature data in terms of a predetermined matching condition, and also if it is found, as the comparison result by the time stamp verifying section, that a difference between the time stamp and the current time falls within a predetermined range, the user is identified as the authorized user of the portable electronic device.

(4-3) The portable electronic device further comprises: a user information register section having pre-stored user information about the authorized user of the portable electronic device; and an encryption section for encoding data, which is to be transmitted from the transceiving interface to the data processing device, with the valid secret key. As a result of comparison by the biometric feature data verifying section and the time stamp verifying section, if the user is identified as the authorized user of the portable electronic device, the encryption section encodes at least one of the following items: the user information; the level of correlation between the to-be-verified biometric feature data and the valid biometric feature data, which correlation level is obtained at the comparison; and the date and time of the comparison performed, which is provided by the clock function section, the encoded item is sent out from the transceiving interface to the data processing device as a verification result.

(4-4) If the user is identified as the authorized user of the portable electronic device, as the comparison result by the biometric feature data verifying section and the time stamp verifying section, and also if a message digest, which is obtained by inputting data to be transferred to the portable electronic device to a predetermined one-way function, is attached to the original to-be-verified biometric feature data restored by the decryption section, the encoding section encodes the message digest, and the encoded message digest is then sent out from the transceiving interface to the data processing device as a verification result.

(4-5) The portable electronic device further includes a verification log recording section storing the aforementioned verification results as a verification log for a predetermined time period.

(4-6) Upon receipt of a predetermined signal via the transceiving interface, the portable electronic device transmits public key information of the authorized user, which public key information is registered in the portable electronic device, from the transceiving interface to an external apparatus.

(4-7) The portable electronic device further comprises a lock function section which is operable to prohibit biometric feature information from being input to the portable electronic device, if the evaluation is made a predetermined number of times successively, as the result of the comparison by the featured at a verifying section, that the to-be-verified biometric feature data never matches the valid biometric feature data in terms of a predetermined matching condition.

According to the portable electronic device with a user verification function utilizing biometric information of the foregoing item (4-1), upon receipt of encoded data via the transceiving interface, the decryption section restores the original to-be-verified biometric feature data, and then, the biometric feature data verifying section compares/verifies the to-be-verified biometric feature data with valid biometric feature data.

In this manner, according to the portable electronic device of the foregoing item (4-1), the to-be-verified biometric feature data is encoded using a public key before it is transmitted from the data processing device to the portable electronic device. Thus, even if the to-be-verified biometric feature data should be intercepted using a false portable electronic device (a false IC card, or the like), it is still difficult to wrongfully use such to-be-verified biometric feature data (encoded data) in another system. Thus, a high level of security is guaranteed, and user verification can be performed with secure.

According to the portable electronic device of the foregoing item (4-2), in a case where a time stamp, which indicates the date and time to-be-verified biometric feature data was extracted, is attached to the to-be-verified biometric feature data, the object person is judged to be the authorized user of the portable electronic device, if predetermined matching requirements between the to-be-verified biometric feature data and valid biometric feature data are met, and also if the difference between the time stamp (extraction date-and-time) and the current time falls within a predetermined range. Accordingly, even if to-be-verified biometric feature data to be input to the portable electronic device should be intercepted, and even if the stolen feature data should be falsely used in a replay attack against the portable device, the difference between the time stamp (extraction date-and-time) and the current time becomes significant. On the basis of such significant difference, it is possible to reject access attempts using such stolen to-be-verified biometric feature data, so that the security level of the system is significantly improved.

According to the portable electronic device of the foregoing item (4-3), after the object user is verified, the encryption section encodes at least one of the following items using a secret key: user information (e.g., account number); the level of correlation between the to-be-verified biometric feature data and the valid biometric feature data; and the verification date-and-time (time stamp). The encoded item is then sent out to the data processing device as a verification result. That is, since the information about the verification result is encoded using a secret key, the issuer of the verification result can be certified. At that time, since the verification date-and-time (time stamp) is inserted into the verification result, it is possible to prevent the verification result of the biometric feature data from being tempered or falsified. Accordingly, even when the result of the verification of biometric feature data, obtained within the portable electronic device, is sent out to an external apparatus, a high level of security is guaranteed, thus realizing secure user verification. At that time, since the level of correlation between the to-be-verified biometric feature data and the valid biometric feature data is provided as a verification result, it is possible to manage a record of likelihood of the matches.

According to the portable electronic device of the foregoing item (4-4), if the object user is judged to be the authorized user of the portable device, and also if a message digest is attached to the to-be-verified biometric feature data, the massage digest is encoded by the encryption section using a secret key, before it is sent out to an external apparatus as a verification result. Resulting from this, similar effects and benefits to those already described in the portable electronic device of the foregoing item (4-3) are guaranteed. Additionally, since a message digest is output as a verification result, it is possible to manage a record of which transaction the verification was made for.

According to the portable electronic device of the foregoing item (4-5), the verification log recording section stores the verification result, as a verification log, for a predetermined time period. That is, a record of user verification is stored in the portable electronic device.

According to the portable electronic device of the foregoing item (4-6), upon receipt of a predetermined signal, the authorized user's public key information, registered in the portable electronic device, is sent out to an external device. It is thus possible for the external apparatus to use the public key stored in the portable electronic device, without the necessity for the external apparatus to hold a pre-stored public key.

According to the portable electronic device of the foregoing item (4-7), as a result of the comparison by the feature data verifying section, if the evaluation is made a predetermined number of times successively, that the predetermined matching condition between the to-be-verified biometric feature data and the valid biometric feature data is not satisfied, a lock function section prohibits the inputting of biometric feature information to the portable electronic device, so that any false access attempts can be reliably rejected.

BRIEF DESCRIPTION OF THE DRAWINGS

FIG. 16 is a flowchart indicating an operation of the third modified example of the second embodiment.

BEST MODE FOR CARRYING OUT THE INVENTION

Figure 1:
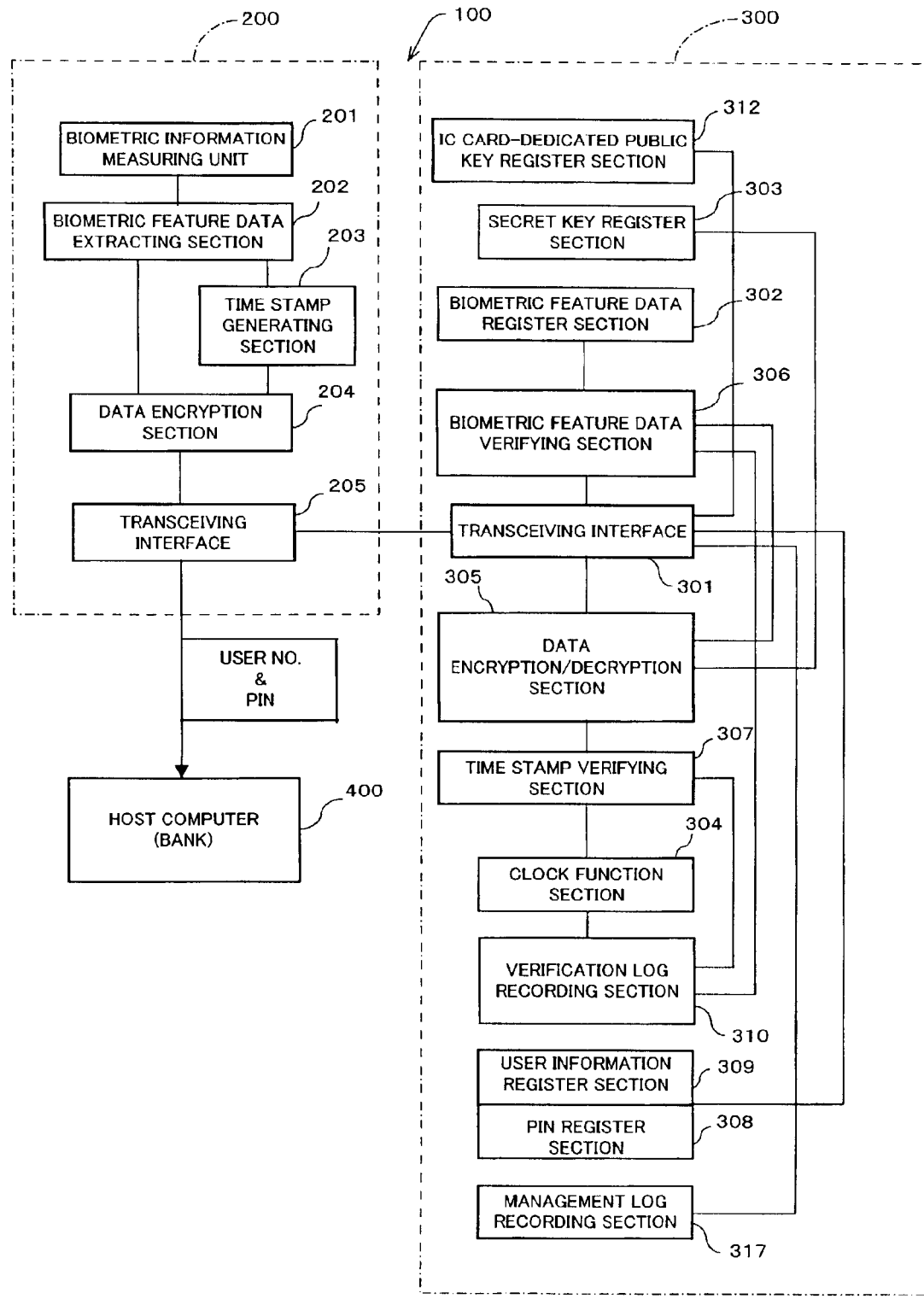
FIG. 1 is a block diagram schematically showing a structure of a user verification system of a first embodiment of the present invention.

Preferred embodiments of the present invention will be described hereinbelow with reference to the relevant accompanying drawings.

[0] Brief Description of Embodiments of the Present Invention:

In a first embodiment of the present invention, a description will be made hereinbelow of a case where a portable electronic device is an IC card which serves as, for example, a debit card. Precisely, in a user verification system of the first embodiment, a personal identification number (PIN) has to be entered as verification. Additionally, the first embodiment combines another verification technique that employs biometric information, which is rarely stolen or duplicated, with PIN verification, so that leakage and theft of the PIN can be surely prevented, thereby guaranteeing high security with secure user identification.

More precisely, an IC card has pre-stored valid biometric feature data, which has been extracted from biometric information of the authorized user of the IC card. If predetermined matching requirements are satisfied between the valid biometric feature data and object biometric feature data to be verified (hereinafter called to-be-verified biometric feature data), indicating that the to-be-verified biometric feature data matches the valid biometric feature data, a PIN stored in the IC card is output to a host computer (management device) via an interface.

Accordingly, in a case where an IC card of the present invention serves as a debit card, after a user is verified in the IC card utilizing biometric information, the PIN stored in the IC card is directly transmitted from the IC card to a host computer, which will eliminate the necessity for the user to input his PIN in sight of a shop clerk, thereby preventing the possibility of the PIN being seen. At that time, since the PIN is encoded using a public key for the host computer, the security of the PIN during transmission is thoroughly improved. Further, a time stamp (the date and time the user verification was performed) is encoded together with the PIN. Thus, even if the PIN should be stolen during transmission, it is still possible to prevent the stolen PIN from being used to access other systems later.

In a second embodiment of the present invention, since a public key system is employed in data communication between a portable electronic device (an IC card in the present embodiment) and an external data processing device (an IC card terminal in the present embodiment), a high level of security ability is guaranteed at inputting to-be-verified biometric feature data to the portable electronic device and at outputting the result of biometric feature data verification, which has been performed in the portable electronic device, to the portable electronic device, thereby realizing secure user verification.

More precisely, in the second embodiment, the IC card also has pre-stored valid biometric feature data, which has been extracted from biometric information of the authorized user of the IC card. The user (authorized user) of the IC card inputs biometric information of his own to the IC card terminal, which then processes the input biometric information to extract biometric feature data. The thus extracted to-be-verified biometric feature data is input from the IC card terminal to the IC card. At that time, the to-be-verified biometric feature data is encoded using a public key before it is sent out to the IC card.

Then, if predetermined matching requirements are satisfied between the to-be-verified biometric feature data and the valid biometric feature data, indicating that the to-be-verified biometric feature data matches the valid biometric feature data, the IC card merges a message digest which is attached to the to-be-verified biometric feature data, the biometric feature data verification result (the degree of correlation), the date and time the verification was performed, and user information about the authorized user of the IC card. Those merged items are encoded with a valid secret key for the IC card, and the encoded data is then sent out to the IC card terminal as a verification result.

In this manner, since the second embodiment employs biometric user verification, without relying on a password, it is possible to provide a user verification technique suited to a tamper-resistant IC card. Further, since the biometric feature data is encoded using a public key system before the data is transmitted to the IC card, it is possible to protect the IC card from counterfeit biometric feature data.

Further, in the second embodiment, the result of the verification performed on the IC card is encoded using the valid secret key stored in the IC card before it is sent out to an external apparatus, and the user verification is performed within the IC card, so that the valid biometric feature stored the IC card is never sent out to an external apparatus, and that a verification result is never entered from an external apparatus to the IC card. It is thus possible to reduce with certainty the possibility of fraudulent use.

At that time, if a verification result undergoes PKI (public key infrastructure) processing before it is output from the IC card to an external apparatus, or if a message digest is created and attached to the verification result, it is possible to lower the possibility of the verification result being tampered with or counterfeited with further certainty.

[1] First Embodiment:

FIG. 1 is a block diagram showing a user verification system of a first embodiment of the present invention. As shown in FIG. 1, user verification system 100 includes IC card (portable electronic device) 300 serving as a debit card, IC card terminal (external data processing device) 200 which receives IC card 300 and makes a direct access to the IC card 300, and host computer (management device) 400 which accesses the IC card 300 via the IC card terminal 200 to carry out user verification utilizing a personal identification number (PIN) as to the authorized user of the IC card 300.

Host computer 400 belongs to a bank. The authorized user has a bank account in the bank, and when he uses IC card 300 as a debit card, his money is subtracted from the bank account. In practical use, such a debit card is used in combination with an external data processing device such as a debit card terminal (IC card terminal 200, here). This external data processing device is connected with host computer 400, which manages the balances of bank accounts, via a communications network.

IC card terminal 200 has a slot (not shown) into which IC card 300 is to be inserted. IC card 300 is inserted into the slot, whereupon transceiving interface 205 (first transceiving interface) of the IC card terminal 200 comes into contact with transceiving interface (second transceiving interface) 301 of the IC card 300, thereby allowing the IC card terminal 200 and the IC card 300 to send/receive data therebetween. In the first embodiment, transceiving interfaces 205 and 301 are contact-type interfaces. The present invention should by no means be limited to the above, and it is also possible to use contactless interfaces.

IC card terminal 200 has biometric information measuring unit 201, biometric feature data extracting section 202, time stamp generating section 203, data encryption section (first encryption section) 204, and transceiving interface 205.

Biometric information measuring unit 201 measures and samples biometric information of an object user, for example, a person who inserted the IC card 300 into the IC card terminal 200 (this is normally the authorized user of the IC card 300) The biometric information to be sampled may be image data such as a fingerprint, iris pattern, facial pattern, retina pattern, blood vessel pattern, hand shape, signature, and ear shape. It may otherwise be time-series data such as voice, keystrokes, and signature dynamics. For example, in a case of sampling the object user's fingerprint, biometric information measuring unit 201 should include a fingerprint input screen. The object user presses his fingertip against the screen, thereby allowing the biometric information measuring unit 201 to sample the fingerprint.

Biometric feature data extracting section 202 extracts biometric feature data (hereinafter called to-be-verified biometric feature data), which is for use in user verification, from the biometric information sampled by biometric information measuring unit 201. Here, if the sampled biometric information is fingerprint image data, the feature data to be extracted from the sampled fingerprint image data will include the coordinates of ridge dividing points (minutiae), the coordinates of ridge end points (minutiae), the coordinates of ridge crossing points, the coordinates of the fingerprint core, the coordinates of deltas, ridge directions, distances between minutiae, the number of ridges between minutiae, and so on.

Time stamp generating section 203 generates the date and time biometric feature data extracting section 202 extracted the to-be-verified biometric feature data, as a time stamp.

Data encryption section 204 encodes the to-be-verified biometric feature data, which has been extracted by biometric feature data extracting section 202, along with the time stamp (the date and time the to-be-verified biometric feature data was extracted; hereinafter called the "verification date-and-time"), which has been generated by time stamp generating section 203, using a public key for IC card 300. The public key for IC card 300 is given in response to the issuance of a certain command (predetermined signal) to a host computer (not shown; the one separate from host computer 400) or to IC card 300. In the first embodiment, as will be described later, the public key for IC card 300 is stored in the IC card 300 itself. IC card terminal 200 issues a certain command to the IC card 300, thereby obtaining the public key.

Transceiving interface 205, as described above, comes into contact with transceiving interface 301 of IC card 300, thereby realizing data communication not only between IC card terminal 200 and IC card 300 but also between IC card terminal 200 and host computer 400.

IC card 300 of the first embodiment has a built-in storage unit such as a ROM and a RAM, and also contains a CPU (Central Processing Unit) which carries out processing based on the data stored in the storage unit and signals received from an external apparatus. IC card 300 includes transceiving interface 301, biometric feature data register section 302, secret key register section 303, clock function section 304, data encryption/decryption section (serving both as a second encryption section and as a decryption section) 305, biometric feature data verifying section 306, time stamp verifying section 307, PIN register section 308, user information register section 309, verification log recording section 310, IC card-dedicated public key register section 312, and management log recording section 317.

Transceiving interface 301, as described above, comes into contact with transceiving interface 205 of IC card terminal 200, thereby realizing data communication between the IC card terminal 200 and IC card 300.

Biometric feature data register section 302 has pre-stored valid biometric feature data of the authorized user of IC card 300. This valid biometric feature data is sampled, for example, upon issuance of IC card 300. While the IC card 300 is being inserted into the slot of IC card terminal 200, biometric information (fingerprint image data, and so on) of the authorized user of IC card 300 is sampled through IC card terminal 200, and biometric feature data is extracted from the sample data. The thus extracted biometric feature data is written in biometric feature data register section 302 of IC card 300, through IC card terminal 200, as valid biometric feature data.

Secret key register section 303 has a pre-stored valid secret key corresponding to the public key for IC card 300. Clock function section 304 calculates the current time.

Data encryption/decryption section 305 serves both as a decryption section and as an encryption section (second encryption section). Serving as the former, data encryption/decryption section 305 decodes data received from an external apparatus through transceiving interface 301, using the valid secret key registered in secret key register section 303. Serving as the latter, data encryption/decryption section 305 encodes data to be transmitted to host computer 400, using the public key for the host computer 400. In the first embodiment, however, data encryption/decryption section 305 functions only as a decryption section, and its function as an encryption section is used in the first through third modified examples of the first embodiment. Here, as will be described later, original data restored by data encryption/decryption section 305 is to-be-verified biometric feature data and time stamp (the date and time of extraction), which have been received from IC card terminal 200.

Biometric feature data verifying section 306 compares the to-be-verified biometric feature data, which has been received from an external apparatus through transceiving interface 301, with the valid biometric feature data registered in biometric feature data register section 302 to evaluate whether or not the to-be-verified biometric feature data satisfies a predetermined matching condition, which is the measure of the matching between the to-be-verified biometric feature data and the valid biometric feature data. An example of the matching condition is, for example, that the correlation between (the degree of resemblance) the to-be-verified biometric feature data and the valid biometric feature data is a predetermined value or greater.

Time stamp verifying section 307 compares the original time stamp, which has been restored by data encryption/decryption section 305, with the current time, which has been calculated by clock function section 304, and evaluates whether or not the difference between them is within a predetermined range (for example, a predetermined value or lower).

PIN register section 308 and user information register section 309 serve as a user information storage unit. PIN register section 308 has a pre-stored personal identification number (password), which is requested to be input when IC card 300 attempts to access host computer 400. With a conventional debit card, a user has to manually input such a personal identification number (PIN) with a ten-key pad. User information register section 309 has a pre-stored account number (bank account number, user number) of a bank account from which the amount spent should be subtracted, when IC card 300 is used as a debit card.

Verification log recording section 310 holds a verification log for a limited time period. The verification log contains the results of the verification carried out by biometric feature data verifying section 306 and by time stamp verifying section 307, and also contains the date and time the verification was performed (hereinafter called the "verification date-and-time"), which date and time has been obtained by clock function section 304.

IC card-dedicated public key register section 312, as described above, has a pre-stored public key (predetermined public key information) for an IC card 300, with which public key data encryption section 204 of IC card terminal 200 encodes to-be-verified biometric feature data and a time stamp. Upon receipt of a predetermined signal (certain command) through transceiving interface 301, IC card 300 transmits the public key stored in IC card-dedicated public key register section 312, from transceiving interface 301 to IC card terminal 200 (or host computer 400).

When the PIN is transmitted to host computer 400 as a verification result (will be described later), management log recording section 317 records, as a management log, the date and time the PIN was sent out, or the content of the transaction performed, or both of these.

At that time, the foregoing biometric feature data register section 302, secret key register section 303, PIN register section 308, user information register section 309, verification log recording section 310, IC card-dedicated public key register section 312, and management log recording section 317 are realized, in practical use, by a storage unit such as a ROM and a RAM internally equipped in IC card 300.

The foregoing clock function section 304, data encryption/decryption section 305, biometric feature data verifying section 306, and time stamp verifying section 307 are realized, in practical use, by a CPU built in IC card 300.

Figure 2:
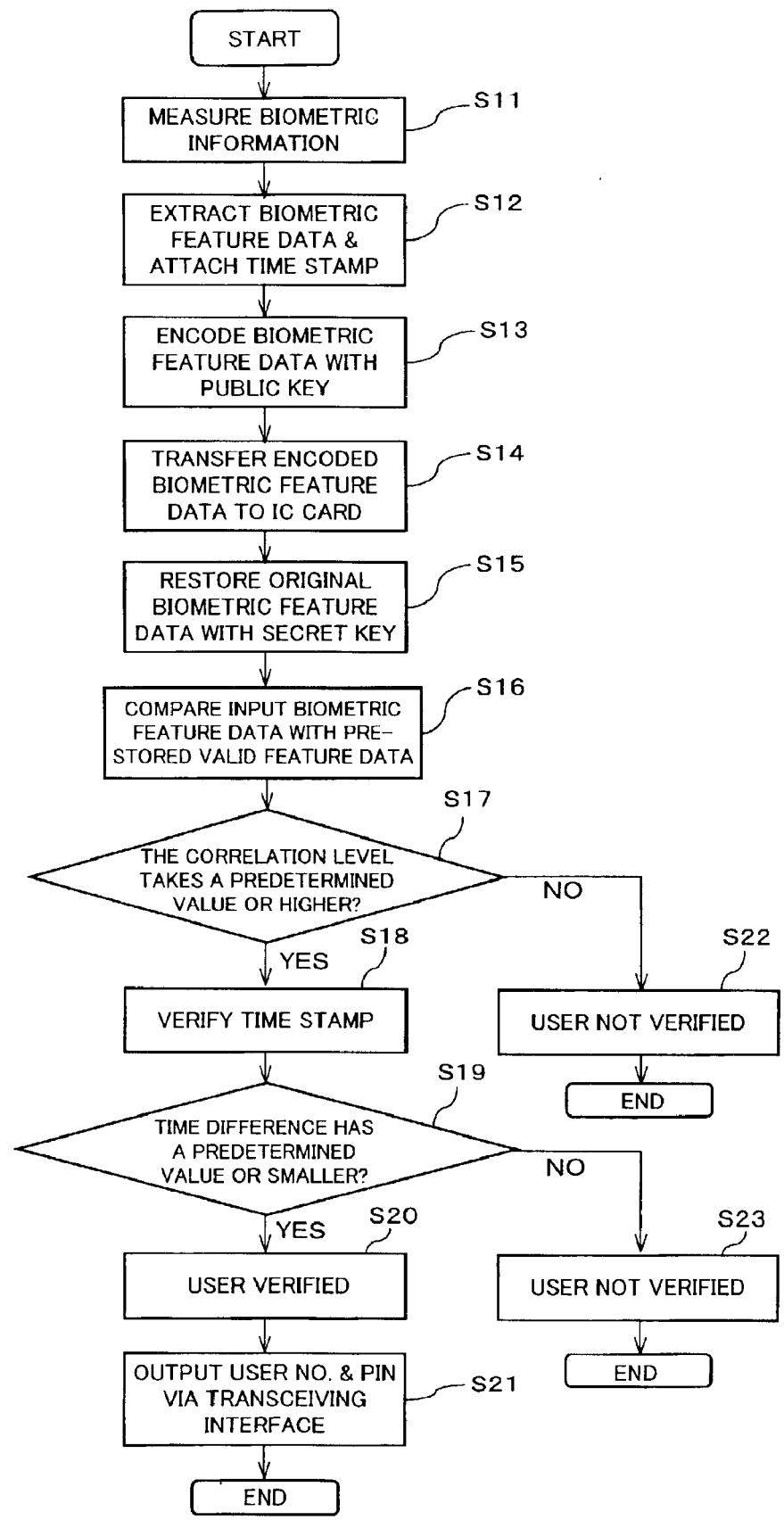
FIG. 2 is a flowchart indicating an operation of the first embodiment.

Next, an operation of user verification system 100 of the first embodiment will be described hereinbelow, with reference to the flowchart of FIG. 2.

When using IC card 300 as a debit card, a user (object person to be verified) puts the IC card 300 into the slot of IC card terminal 200, and then presses his fingertip to a fingerprint input screen, if his fingerprint image data is requested to be entered as the biometric information for use in user verification.

Biometric information measuring unit 201 of IC card terminal 200 measures the user's biometric information (fingerprint image data) (step S11). From the biometric information, biometric feature data extracting section 202 extracts to-be-verified biometric feature data, and time stamp generating section 203 generates the date and time (time stamp) the to-be-verified biometric feature data was extracted, and the time stamp is attached to the to-be-verified biometric feature data (step S12).

The to-be-verified biometric feature data, along with the time stamp attached thereto, is encoded by data encryption section 204 using a public key for IC card 300 (step S13). The public key for IC card 300, as described above, is read out from IC card-dedicated public key register section 312 of IC card 300. Upon receipt of a specific command (predetermined signal), the IC card-dedicated public key register section 312 allows the public key to be read out therefrom, and the read-out public key is sent out from IC card 300 to IC card terminal 200. Since this key for use in encryption, which is sent out from IC card 300 to IC card terminal 200, is a public key, it does not matter if the key is sent out in response to a simple command.

After that, the to-be-verified biometric feature data encoded by data encryption section 204 using the public key, is transferred/transmitted, along with the time stamp attached thereto, from transceiving interface 205 to IC card 300 (step S14).

When IC card 300 receives encoded data via transceiving interface 301, data encryption/decryption section 305 restores the encoded data, using a valid secret key, into the original to-be-verified biometric feature data and time stamp (step S15). Biometric feature data verifying section 306 first compares the to-be-verified biometric feature data with the valid biometric feature data (step S16).

As a result of the comparison, if the level of correlation (the degree of the matching) between the to-be-verified biometric feature data and the valid biometric feature data is below a predetermined value (NO route of step S17), the object person is judged not to be the authorized user of the IC card 300 (step S22), and a predetermined action (for example, locking the card) is taken.

Otherwise, if the level of correlation (the degree of the matching) between the to-be-verified biometric feature data and the valid biometric feature data is a predetermined value or higher (YES route of step S17), time stamp verifying section 307 compares the time stamp restored by data encryption/decryption section 305 with the current time calculated by clock function section 304 (step S18).

As a result of the comparison, if the difference between the time stamp (the extraction date-and-time) and the current time exceeds a predetermined value (NO route of step S19), the object person is judged not to be the authorized user of the IC card 300 (step S23), and a predetermined action (for example, locking the card) is taken.

Otherwise, if the difference between the time stamp (the extraction date-and-time) and the current time is a predetermined value or lower (YES route of step S19), the object person is judged to be the authorized user of the IC card 300 (step S20), the PIN and the account number (user number) are read out from PIN register section 308 and user information register section 309, respectively, and then output/transmitted, as the verification result ("OK"), from transceiving interface 301 to host computer 400 via transceiving interface 205 of IC card terminal 200 (step S21).

After that, IC card 300 transmits/receives data to/from host computer 400 in accordance with a predetermined protocol, and similar processing to that which is carried out to a common debit card is performed between host computer 400 and IC card 300. At that time, transceiving interface 205 of IC card terminal 200 only transfers (allows the data pass therethrough) the data transmitted/received between host computer 400 and IC card 300, without taking the data in itself. Host computer 400 receives the account number and the PIN, and then moves a specified amount of money from that account to another account. The result of the transaction may be printed out by IC card terminal 200, or may be written in IC card 300 as a log.

In IC card 300 of the first embodiment, verification results ("OK"/"NG") obtained by biometric feature data verifying section 306 and time stamp verifying section 307 are held, together with the verification date-and-time obtained by clock function section 304, in verification log recording section 310 for a predetermined time period. If the PIN and the account number are transmitted as a positive user verification result, the date and time of their transmission and the content of the transaction performed are stored in management log recording section 317 of IC card 300.

In this manner, with user verification system 100 of the first embodiment, after the matching between the to-be-verified biometric feature data and the-valid biometric feature data is confirmed, the PIN and the account number stored in IC card 300 are transmitted to host computer 400. The necessity for directly inputting PIN with a ten-key pad is thus eliminated, and the PIN only passes through IC card terminal 200. It is thus possible to minimize the risk of the PIN being stolen when it is input.

Therefore, since PIN verification is associated with biometric user verification utilizing biometric information, which is free of being stolen or faked, it is possible to surely prevent the leakage and the theft of the PIN, so that a high level of security can be guaranteed, thereby realizing secure user verification.

Further, in user verification system 100 of the first embodiment, the to-be-verified biometric feature data is encoded by a public key system before the data is transmitted from IC card terminal 200 to IC card 300, and all the data having been input to IC card 300 for use in user verification is decoded within IC card 300. Accordingly, the present system prevents the inputting of falsified to-be-verified biometric feature data, so that fraud can be effectively prevented, thereby guaranteeing a high level of security.

Even if to-be-verified biometric feature data should be stolen, with a false IC card being inserted into the slot of IC card terminal 200, it is still difficult to wrongfully use the stolen public key in another system, because the key is encoded by a public key system. It is thus possible to guarantee a high level of security, realizing secure user verification.

Further, if the stolen to-be-verified biometric feature data is used in a replay attack against IC card 300, the difference between the date and time the to-be-verified biometric feature data was extracted and the current time inevitably becomes significant. Taking advantage of this fact, user verification system 100 of the first embodiment compares the date and time the to-be-verified biometric feature data was extracted (time stamp) with the current time. Access attempts made by using the to-be-verified biometric feature data are rejected if the difference between the time stamp (extraction date-and-time) and the current time is significantly great. It is thus difficult to use the stolen to-be-verified biometric feature data in a replay attack, thereby guaranteeing a higher level of security.

Further, in user verification system 100 of the first embodiment, when IC card 300 receives a predetermined signal (command) via transceiving interface 301, the public key stored in IC card-dedicated public key register section 312 is read out and is then sent out to an external apparatus. Thus, even if IC card terminal 200 (or host computer 400) stores no public key for IC card 300, it is still possible to use the public key stored in IC card 300.

Still further, in user verification system 100 of the first embodiment, since management log recording section 317 stores the date and time the PIN and the account number were transmitted and the content of the transaction performed, it is possible for the user of IC card 300 to keep a management log for himself, separate from the one for the system. The user log will serve as a safeguard against a low-reliability system.

Furthermore, in user verification system 100 of the first embodiment, verification log recording section 310 of IC card 300 stores verification results ("OK"/"NG") obtained by biometric feature data verifying section 306 and time stamp verifying section 307, as a verification log, for a predetermined time period. That is, a history of user verification is stored in IC card 300.

In the foregoing first embodiment, the present invention is applied to IC card 300 that serves as a debit card. The present invention should by no means be limited to the above, and IC card terminal 200 can be replaced with an IC card reader, and host computer 400 can be replaced with a personal computer (PC), thereby enabling the application of the present invention to a system for controlling access to the PC.

Figure 3:
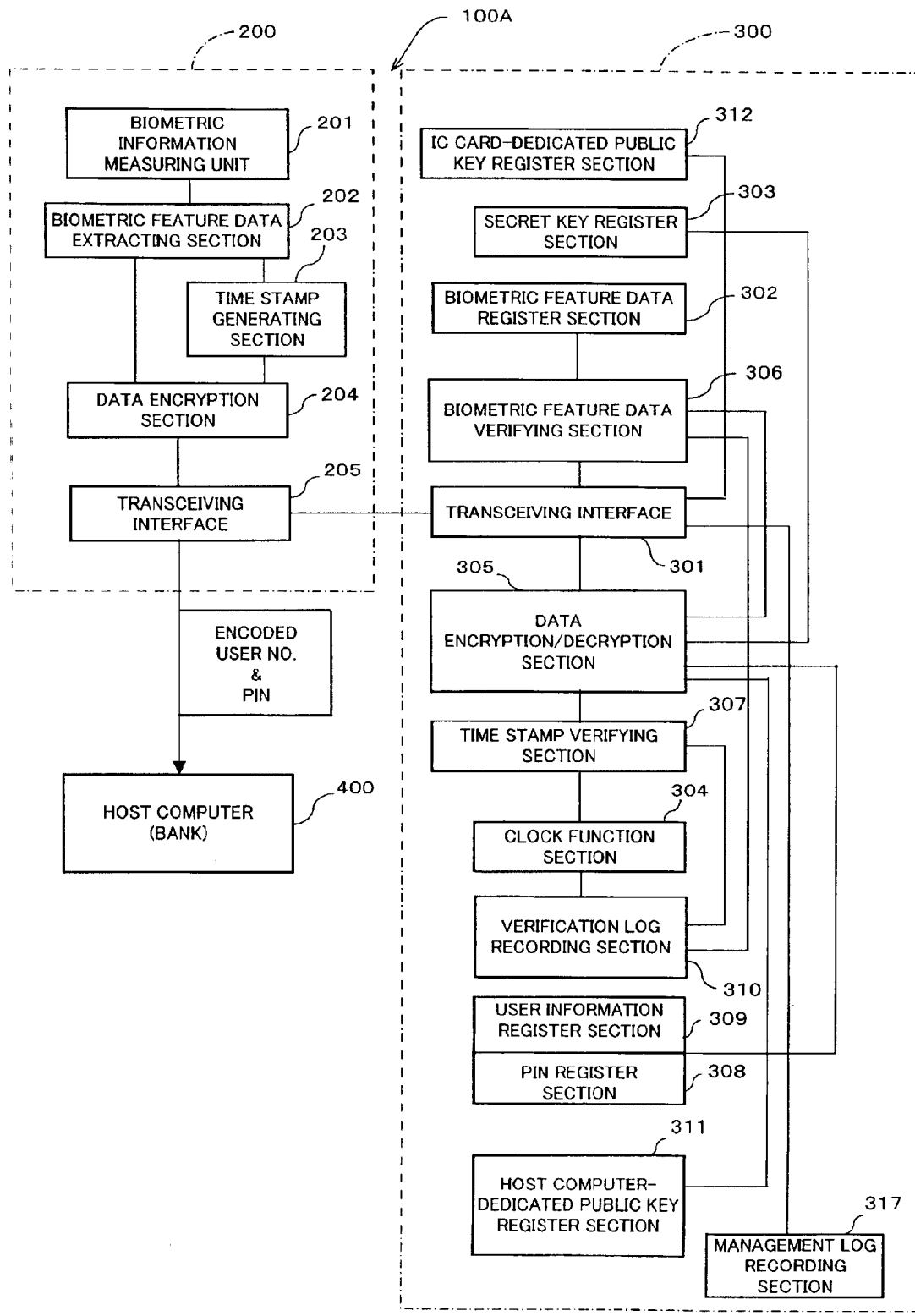
FIG. 3 is a block diagram schematically showing a structure of a user verification system of a first modified example of the first embodiment.

[1-1] First Modified Example of the First Embodiment:

FIG. 3 is a block diagram showing a structure of a user verification system according to a first modification of the first embodiment of the present invention. Like reference numbers designate similar parts or elements throughout several views of the present embodiment, so their detailed description is omitted here.

As shown in FIG. 3, in user verification system 100A of the first modification of the first embodiment, the following functions are added to IC card 300 of user verification system 100 of FIG. 1.

In other words, user verification system 100A is an advanced version of user verification system 100. In user verification system 100A, a PIN and an account number are encoded using a public key for host computer 400, before they are transmitted to host computer 400. At the time the PIN and the account number are encoded, a time stamp (verification date-and-time) is added to them.

For this purpose, IC card 300 of user verification system 100A includes host computer-dedicated public key register section (management device-dedicated public key register section) 311, which has a pre-stored public key for host computer 400. Such a host computer-dedicated public key register section 311 is, in practical use, realized by an internal storage unit, such as a ROM and a RAM, of IC card 300.

In IC card 300 of user verification system 100A, if an object person is judged to be the authorized user of portable electronic device 300, as a result of the verification carried out by biometric feature data verifying section 306 and time stamp verifying section 307, the date and time the verification was performed is obtained by clock function section 304, and the verification date-and-time is added to the PIN and the account number to be transmitted to host computer 400, as a time stamp.

The foregoing data encryption/decryption section 305 encodes the PIN and the account number to be transmitted to host computer 400, along with the time stamp (the verification date-and-time), using a public key for host computer 400.

Figure 4:
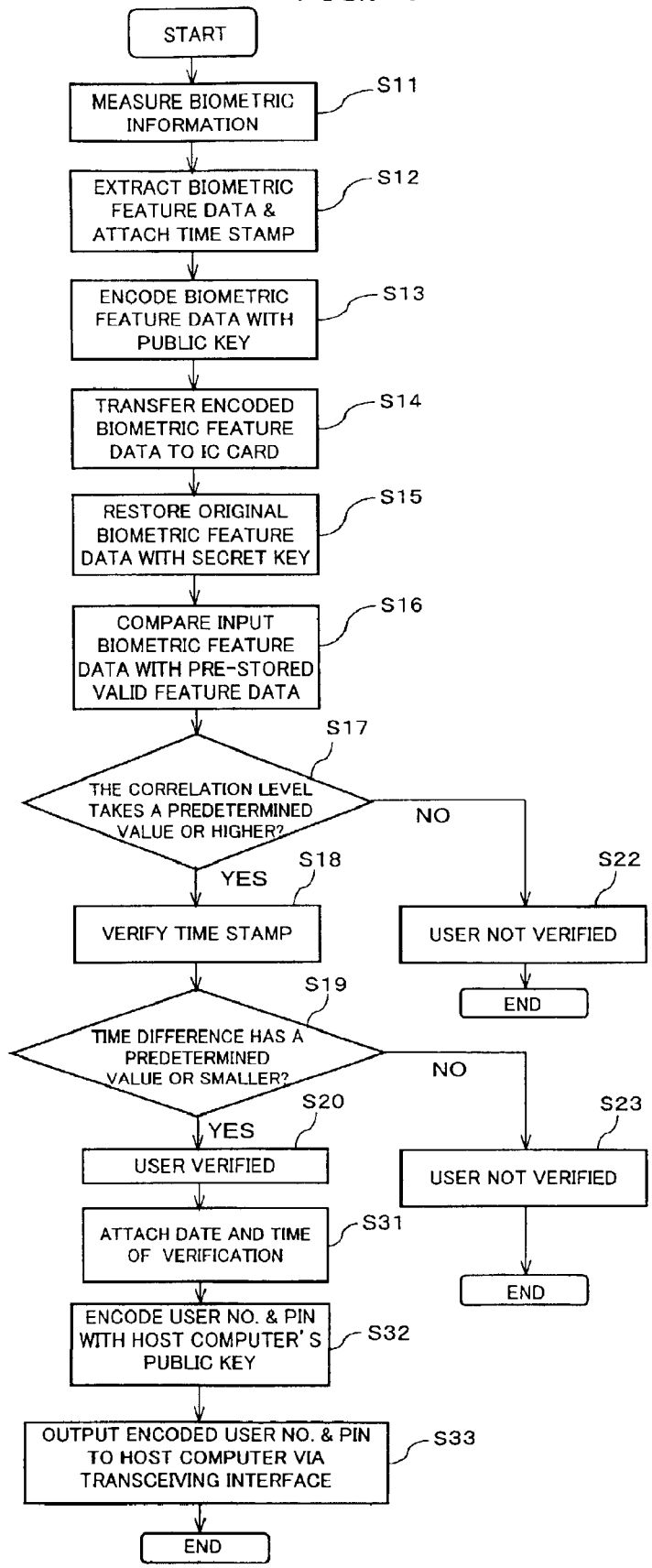
FIG. 4 is a flowchart indicating an operation of the first modified example of the first embodiment.

Referring now to the flowchart of FIG. 4, a description will be made hereinbelow of an operation of user verification system 100A of the first modification to the first embodiment. Like step numbers designate the same processing as in FIG. 2, so their detailed description is omitted here.

If the object person is judged to be the authorized user of portable electronic device 300 in step S20, clock function section 304 obtains the date and time when the verification was performed, and the verification date-and-time is attached, as a time stamp, to the PIN and the account number to be transmitted to host computer 400 (step S31).

After that, the PIN and the account number are encoded by data encryption/decryption section 305 with a public key for host computer 400 (step S32), and then transmitted/ transferred from transceiving interface 301 to host computer 400 via transceiving interface 205 of IC card terminal 200 (step S33).

User verification system 100A of the first modification of the first embodiment guarantees similar effects and benefits to those already described in the first embodiment. Additionally, even if the verification results, including the PIN, are intercepted by undesirable parties during their transmission to an external apparatus, it is still difficult for those third parties to wrongfully use the stolen PIN in another system, because the verification results (a PIN, an account number, the verification date-and-time, and so on) have been encoded using the public key for host computer 400 before they are sent out from IC card 300 to host computer 400. Thus the security level of the system is significantly improved.

As to a verification result transmitted to host computer 400 in user verification system 100A, the result contains the date and time the verification was performed, which has been attached to the verification result as a time stamp. As a result, even if the verification result (PIN) should be intercepted and then wrongfully used, host computer 400, which monitors the verification date-and-time attached to the PIN, can recognize that a wrongfully obtained PIN is used, based on the difference between the verification date-and-time (time stamp) and the current time.

More precisely, if such a stolen PIN is used to access host computer 400, the difference between the verification date-and-time (timestamp) and the current time inevitably becomes great. Host computer 400 uses this trait to evaluate whether or not the object PIN is an intercepted one, and upon recognition of the stolen PIN, host computer 400 rejects the access attempt. It is thus difficult to reuse the stolen PIN, so that a higher level of security is guaranteed. It is difficult to reuse the same data.

Figure 5:
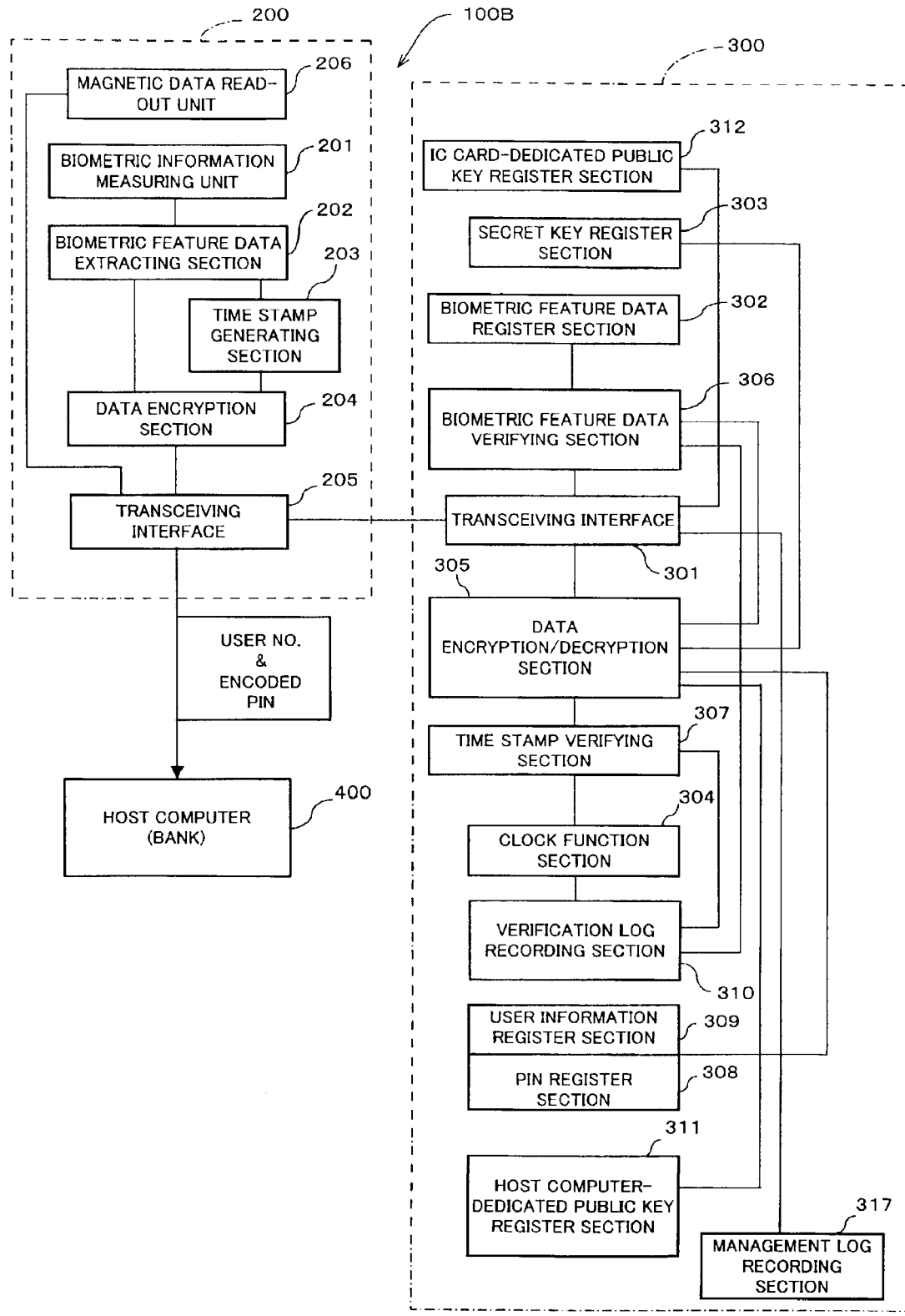
FIG. 5 is a block diagram schematically showing a structure of a user verification system of a second modified example of the first embodiment.

[1-2] Second Modified Example of the First Embodiment:

FIG. 5 is a block diagram showing a structure of a user verification system according to a second modification to the first embodiment of the present invention. Like reference numbers designate similar parts or elements throughout several views of the present embodiment, so their detailed description is omitted here.

As shown in FIG. 5, in user verification system 100B of the second modification of the first embodiment, the following functions (of magnetic data read-out unit 206) are added to IC card terminal 200 of user verification system 100A of FIG. 3.

More precisely, in the second modification to the first embodiment, user information including an account number (bank account number, user number) is previously recorded, as magnetic data, in magnetic stripes (recording unit; not shown) prepared on the surface of IC card 300, as in the case of a magnetic card. IC card terminal 200 has magnetic data read-out unit 206 for reading-out magnetic data stored in the magnetic stripes on the surface of IC card 300.

Figure 6:
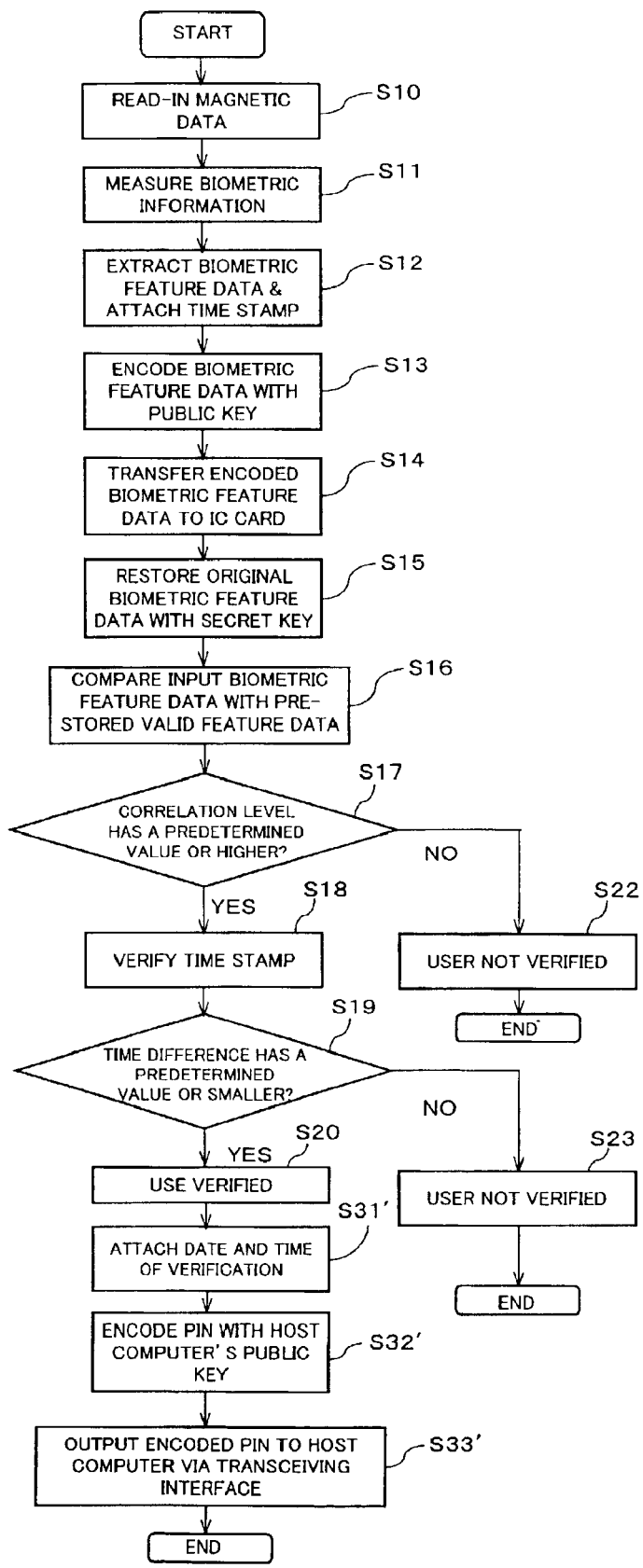
FIG. 6 is a flowchart indicating an operation of the second modified example of the first embodiment.

Referring now to the flowchart of FIG. 6, a description will be made hereinbelow of an operation of user verification system 100B of the second modification to the first embodiment. Like step numbers designate the same processing throughout FIG. 2, FIG. 4, and FIG. 6, so their detailed description is omitted here.

In user verification system 100B, when IC card 300 is used as a debit car, a user (object person to be verified) first inserts IC card 300 into the slot of IC card terminal 200. Magnetic data read-out unit 206 reads out magnetic data, that is, user information such as an account number (bank account number, user number), from magnetic stripes prepared on the surface of IC card 300 (step S10).

After that, if the object user is judged to be the authorized user of IC card 300 in step S20, clock function section 304 obtains the date and time when the verification was performed, and the verification date-and-time is attached, as a time stamp, to the PIN to be transmitted to host computer 400 (step S31').

The PIN is encoded, along with the time stamp (the verification date-and-time), by data encryption/decryption section 305 using a public key for host computer 400 (step S32'), and then passes through transceiving interface 301 and transceiving interface 205 of IC card terminal 200. The encoded PIN, together with the account number (bank account number, user number) read out from the magnetic stripes, is transmitted/transferred from transceiving interface 205 to host computer 400 (step S33').

In this modification, since user information such as the account number (bank account number, user number) is recorded in the magnetic stripes on the surface of IC card 300, user information register section 309 built in IC card 300 may be optional.

In this manner, user verification system 100B of the second modification of the first embodiment guarantees similar effects and benefits to those already described in the first modification to the first embodiment. Additionally, user verification system 100B is applicable in a case where a portable electronic device is an IC card that is equipped with a function (magnetic stripes) of a magnetic card. Moreover, since IC card terminal 200 is capable of coping with both of existing magnetic cards and IC cards, those two different types of cards can be used in user verification system 100B.

Figure 7:
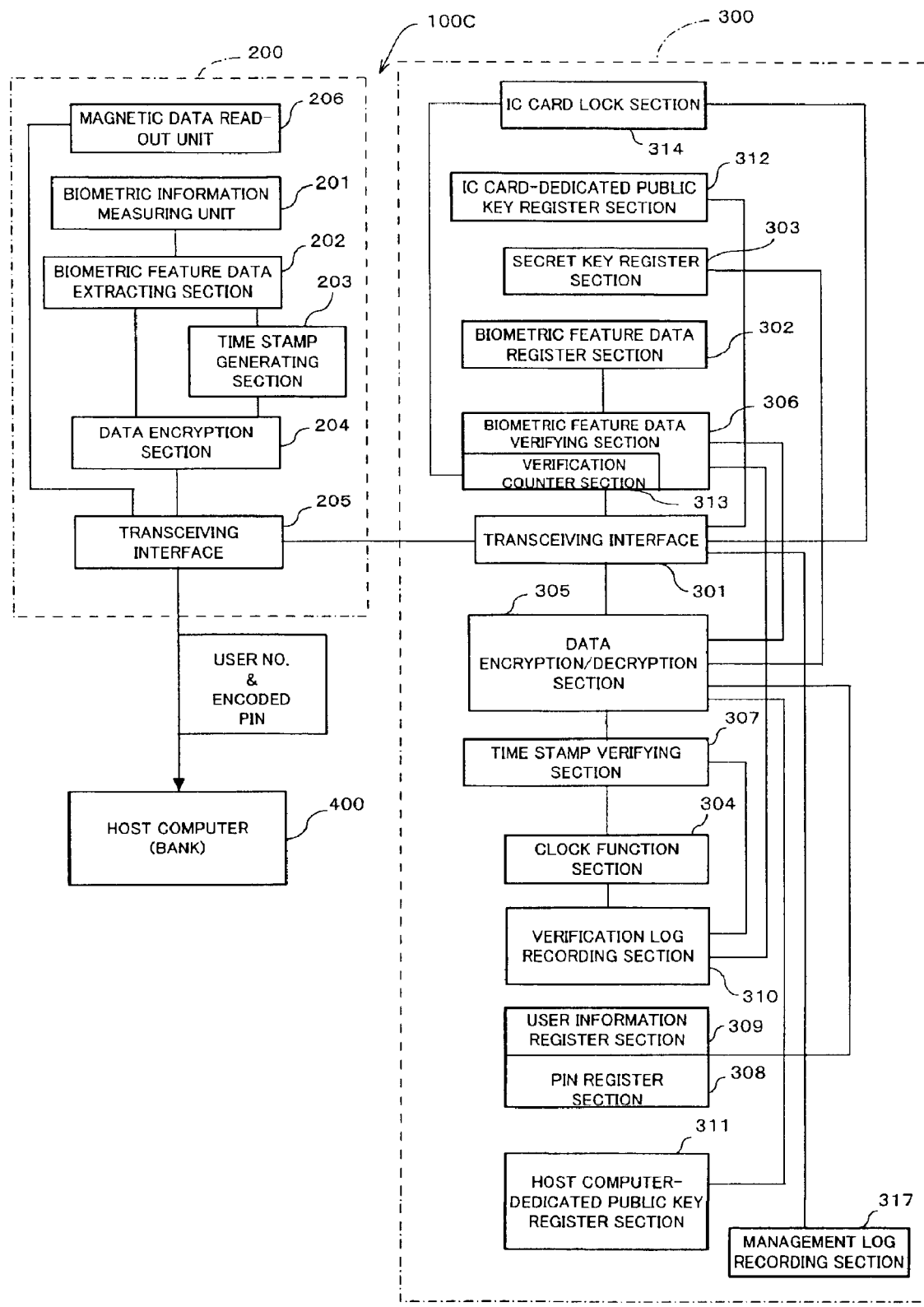
FIG. 7 is a block diagram schematically showing a structure of a user verification system of a third modified example of the first embodiment.

[1-3] Third Modified Example of the First Embodiment:

FIG. 7 is a block diagram showing a structure of a user verification system according to a third modification to the first embodiment of the present invention. Like reference numbers designate similar parts or elements throughout several views of the present embodiment, so their detailed description is omitted here.

As shown in FIG. 7, in user verification system 100C of the third modification to the first embodiment, the following functions (of verification counter section 313 and IC card lock section 314) are added to IC card 300 of user verification system 100B of FIG. 5.

More precisely, biometric feature data verifying section 306 compares to-be-verified biometric feature data with valid biometric feature data, and if the comparison result drops below a predetermined level of correlation a predetermined times consecutively, IC card 300 is locked. A function for locking IC card 300 is equipped to IC card 300 itself.

Thus IC card 300 of user verification system 100A is equipped with the functions of verification counter section 313 and IC card lock section 314. These verification counter section 313 and IC card lock section (lock function section) 314 are, in practical use, realized by a CPU built in IC card 300.

Here, if biometric feature data verifying section 306 obtains a comparison result below a predetermined correlation level more than one time consecutively, verification counter section 313 counts the occurrence of such comparison results.

When the count value obtained by verification counter section 313 reaches the predetermined value, IC card lock section 314 locks IC card 300 to prohibit the inputting of biometric feature data to IC card 300.

Figure 8:
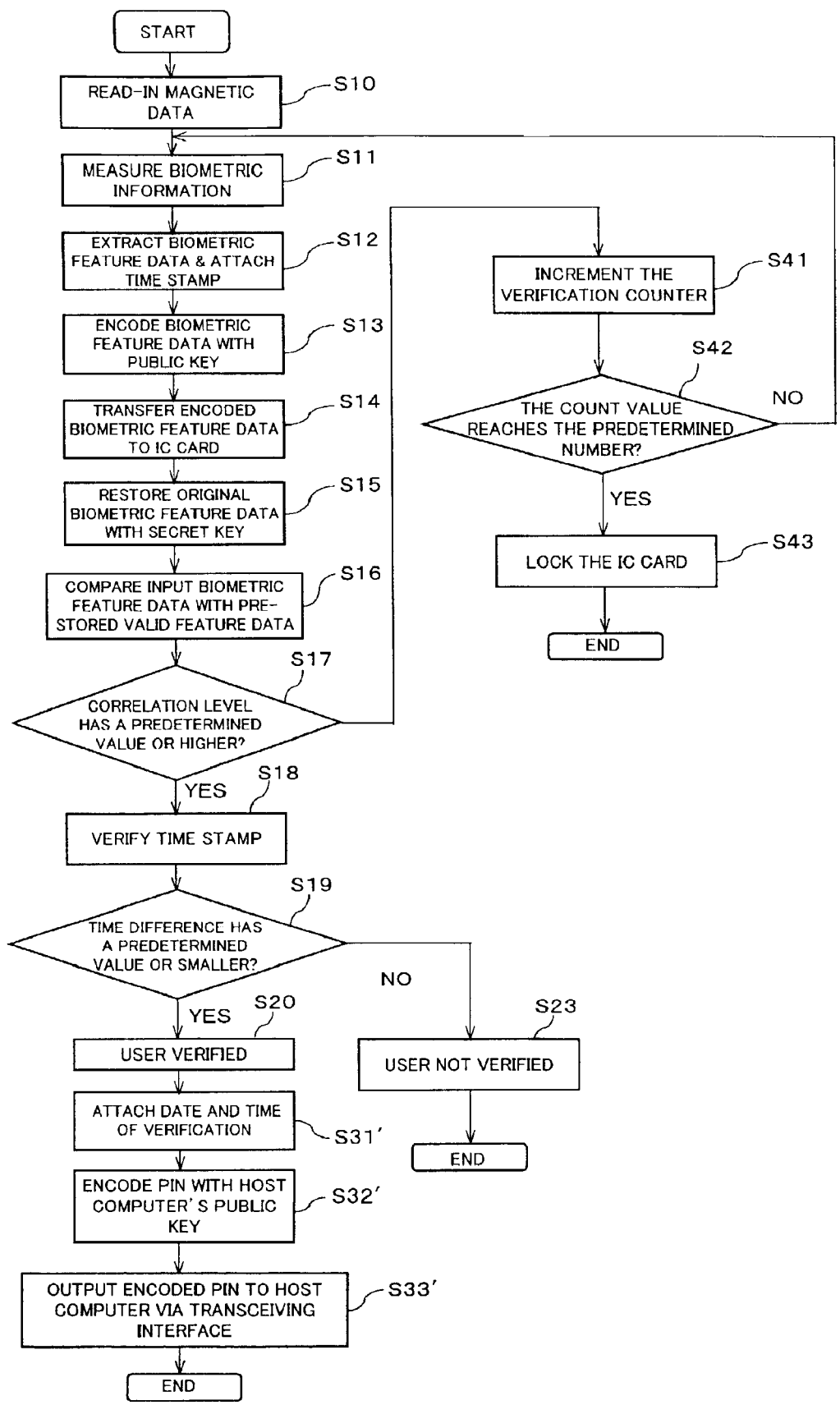
FIG. 8 is a flowchart indicating an operation of the third modified example of the first embodiment.

Referring now to the flowchart of FIG. 8, a description will be made hereinbelow of an operation of user verification system 100C of the third modification to the first embodiment. Like step numbers designate the same processing throughout FIG. 2, FIG. 4, and FIG. 6, so their detailed description is omitted here. If it is judged that the correlation (the degree of a matching) between the to-be-verified biometric feature data and the valid biometric feature data drops below a predetermined value (NO route of step S17), verification counter section 313 increments its count value by one (step S41), and it is then evaluated whether or not the count value reaches a predetermined value (step S42).

If the evaluation yields a negative result (NO route of step S42), a signal (command) for instructing IC card terminal 200 to carry out the measurement of biometric information is transmitted from IC card 300 to IC card terminal 200 once again, and the processing of step S11 through step S17 is then repeated once again.

Otherwise, if the evaluation result is positive (YES route of step S42), IC card lock section 314 locks IC card 300 to prohibit the inputting of biometric feature data to IC card 300 (step S43).

In this manner, user verification system 100C of the third modification of the first embodiment guarantees similar effects and benefits to those already described in the second modification to the first embodiment. Additionally, if biometric feature data verifying section 306 obtains the comparison result a predetermined times consecutively that the matching condition between the to-be-verified biometric feature data and the valid biometric feature data is not satisfied, IC card lock section 314 locks IC card 300 to prohibit the inputting of biometric feature data to IC card 300, thereby preventing unauthorized accessing with reliability.

Figure 9:
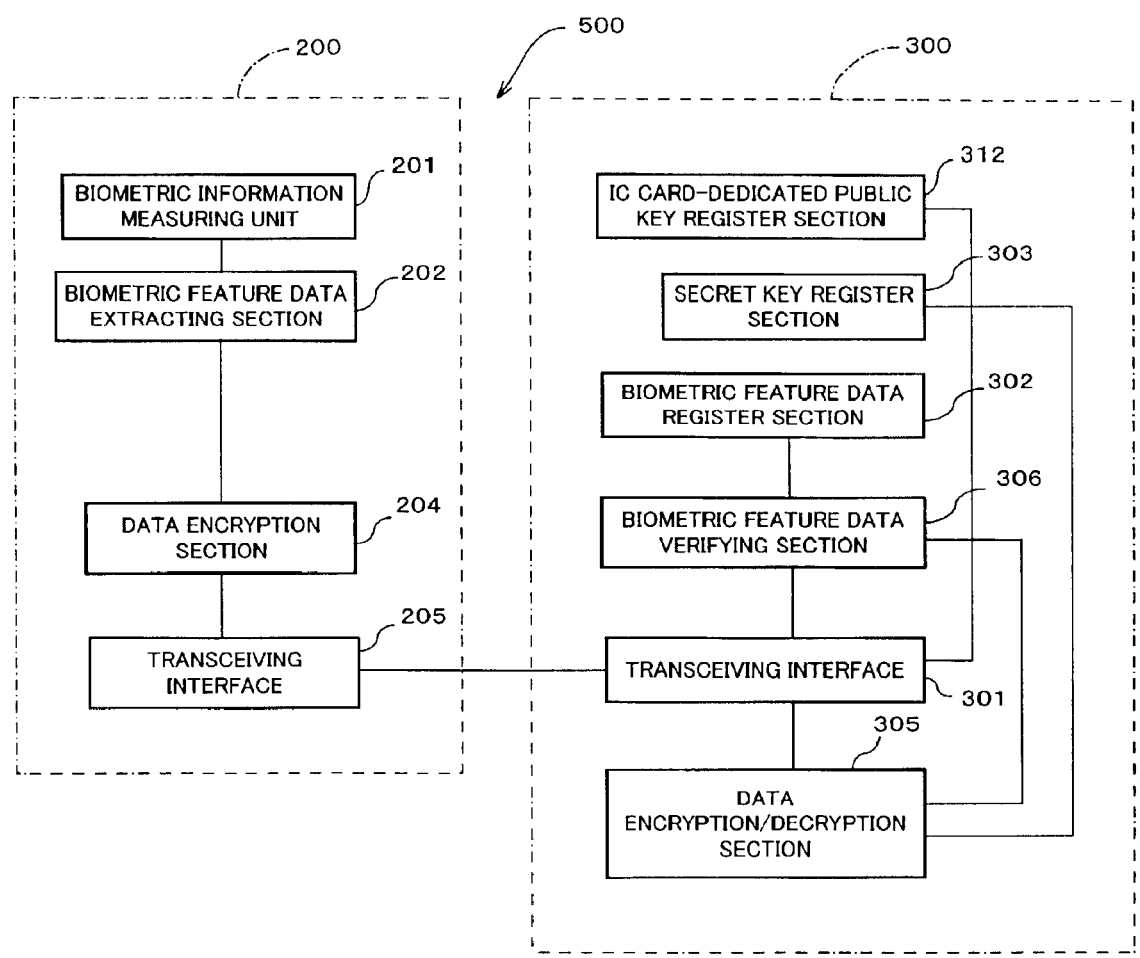
FIG. 9 is a block diagram schematically showing a structure of a user verification system of a second embodiment of the present invention.

[2] Second Embodiment:

FIG. 9 is a block diagram showing a structure of a user verification system according to a second embodiment of the present invention. Like reference numbers designate similar parts or elements throughout several views of the present embodiment, so their detailed description is omitted here.

As shown in FIG. 9, user verification system 500 of the second embodiment includes IC card (portable electronic device) 300, IC card terminal (external data processing device) 200 which receives IC card 300 and makes a direct access to the IC card 300. Note that the IC card 300 of the second embodiment has such a function as a debit card as has already been described in the first embodiment, and is also applicable, as in the case of the first embodiment, to a user verification system that includes a host computer 400 (not shown in the second embodiment).

IC card terminal 200 of the second embodiment, as in the case of the first embodiment, has a slot (not shown) for receiving IC card 300. At an instant IC card 300 is inserted into this slot, transceiving interface (first transceiving interface) 205 of IC card terminal 200 comes into contact with transceiving interface (second transceiving interface) 301 of IC card 300, so that data can be transmitted/received between IC card terminal 200 and IC card 300. In the second embodiment, also, transceiving interfaces 205, 301 are contact-type interfaces. The present invention, however, should by no means be limited to this, contactless interfaces can also be available.

IC card terminal 200 has biometric information measuring unit 201, biometric feature data extracting section 202, data encryption section (first encryption section) 204, and transceiving interface 205.

Biometric information measuring unit 201, as in the case of the first embodiment, measures/samples biometric information of an object user, a person who inserted IC card 300 into the slot of IC card terminal 200 (probably the authorized user of IC card 300). Biometric feature data extracting section 202, as in the case of the first embodiment, extracts to-be-verified biometric feature data from the biometric information measured by biometric information measuring unit 201. As to biometric information and biometric feature data to be extracted from the biometric feature data, similar kinds of biometric data to those described in the first embodiment are used, so their detailed description is omitted here.

Data encryption section 204 encodes the to-be-verified biometric feature data extracted by biometric feature data extracting section 202, using a public key for IC card 300. At that time, as in the first embodiment, the public key for IC card 300 is provided by a host computer (not shown; the one separate from host computer 400) connected with IC card terminal 200, or it is provided by IC card 300 in response to a specific command (predetermined signal) issued to IC card 300. In the second embodiment, also, IC card-dedicated public key register section 312 of IC card 300 has a public key for IC card 300, and IC card terminal 200 issues the specific command to IC card 300 to obtain the public key.

As in the foregoing description, transceiving interface 205 comes into contact with transceiving interface 301 of IC card 300, thereby enabling data communication between IC card terminal 200 and IC card 300.

IC card 300 of the second embodiment, as of the first embodiment, has a built-in storage unit such as a ROM and a RAM, and also contains a CPU which carries out processing based on the data stored in the storage unit and signals received from an external apparatus. IC card 300 includes transceiving interface 301, biometric feature data register section 302, secret key register section 303, data encryption/decryption section (serving both as a second encryption section and as a decryption section) 305, biometric feature data verifying section 306, and IC card-dedicated public key register section 312.

Transceiving interface 301, as in the foregoing description, comes into contact with transceiving interface 205 of IC card terminal 200, thereby enabling data communication between IC card terminal 200 and IC card 300.

Biometric feature data register section 302 has pre-stored valid biometric feature data of the authorized user of IC card 300. This valid biometric feature data is registered, for example, when IC card 300 is initially issued, in the similar way to that described in the first embodiment.

As in the first embodiment, secret key register section 303 has a pre-stored registered secret key corresponding to the public key for IC card 300.

Data encryption/decryption section 305 serves both as a decryption section and as an encryption section (second encryption section). Serving as the former, data encryption/decryption section 305 decodes the data received from an external apparatus through transceiving interface 301, using the valid secret key registered in secret key register section 303. Serving as the latter, data encryption/decryption section 305 encodes data to be transmitted to host computer 400, using the public key for the host computer 400. In the second embodiment, however, data encryption/decryption section 305 functions only as a decryption section, and its function as an encryption section is used in first through third modified examples of the second embodiment. Here, as will be described later, original data restored by data encryption/decryption section 305 is to-be-verified biometric feature data which has been sent out from IC card terminal 200.

Biometric feature data verifying section 306 compares the to-be-verified biometric feature data, which has been received from an external apparatus through transceiving interface 301, with the valid biometric feature data registered in biometric feature data register section 302 to evaluate whether or not the to-be-verified biometric feature data satisfies a predetermined matching condition, which is the measure of the matching between the to-be-verified biometric feature data and the valid biometric feature data. That is, it is evaluated whether or not the correlation (the degree of resemblance) between the to-be-verified biometric feature data and the valid biometric feature data takes a predetermined value or greater.

IC card-dedicated public key register section 312, as described above, has a pre-stored public key (predetermined public key information) for an IC card 300, which is used by public key data encryption section 204 of IC card terminal 200 to encode to-be-verified biometric feature data and a time stamp. Upon receipt of a predetermined signal (certain command) through transceiving interface 301, IC card 300 transmits the public key stored in IC card-dedicated public key register section 312, from transceiving interface 301 to IC card terminal 200.

At that time, the foregoing biometric feature data register section 302, secret key register section 303, and IC card-dedicated public key register section 312 are realized, in practical use, by a storage unit such as a ROM an a RAM internally equipped in IC card 300.

The foregoing data encryption/decryption section 305 and biometric feature data verifying section 306 are realized, in practical use, by a CPU built in IC card 300.

Next, an operation of user verification system 500 of the second embodiment will be described hereinbelow, with reference to the flowchart of FIG. 10. Like step numbers designate the same processing throughout FIG. 2, FIG. 4, and FIG. 6, so their detailed description is omitted here.

When using IC card 300 as a debit card, a user (object person to be verified) puts the IC card 300 into the slot of IC card terminal 200, and then presses his fingertip to a fingerprint input screen, if his fingerprint image data is requested to be input as the biometric information for use in user verification.

Biometric information measuring unit 201 of IC card terminal 200 measures the user's biometric information (fingerprint image data) (step S11). From the biometric information, biometric feature data extracting section 202 extracts to-be-verified biometric feature data (step S121).

The to-be-verified biometric feature data is encoded by data encryption section 204 using a public key for IC card 300 (step S131). The public key for IC card 300, as described above, is read out from IC card-dedicated public key register section 312 of IC card 300. Upon receipt of a specific command (predetermined signal), the IC card-dedicated public key register section 312 allows the public key to be read out therefrom, and the read-out public key is sent out from IC card 300 to IC card terminal 200. Since this key for use in encryption, which is sent out from IC card 300 to IC card terminal 200, is a public key, it does not matter if the key is sent out in response to a simple command.

After that, the to-be-verified biometric feature data encoded by data encryption section 204 using the public key is transferred/transmitted from transceiving interface 205 to IC card 300 (step S141).

When IC card 300 receives encoded data via transceiving interface 301, data encryption/decryption section 305 restores the encoded data, using a valid secret key, into the original to-be-verified biometric feature data (step S151). Biometric feature data verifying section 306 first compares the to-be-verified biometric feature data with the valid biometric feature data (step S16).

As a result of the comparison, if the level of correlation (the degree of the matching) between the to-be-verified biometric feature data and the valid biometric feature data is below a predetermined value (NO route of step S17), the object person is judged not to be the authorized user of the IC card 300 (step S22), and a predetermined action (for example, locking the card) is taken.

Otherwise, if the level of correlation (the degree of a matching) between the to-be-verified biometric feature data and the valid biometric feature data is a predetermined value or higher (YES route of step S17), the object person is judged to be the authorized user of the IC card 300 (step S24). After that, IC card 300 transmits/receives data to/from IC card terminal 200 in accordance with a predetermined protocol.

In this manner, with user verification system 500 of the second embodiment, the to-be-verified biometric feature data is encoded by a public key system before the data is transmitted from IC card terminal 200 to IC card 300, and all the data having been input to IC card 300 for use in user verification is decoded within IC card 300. Accordingly, the present system prevents the inputting of falsified to-be-verified biometric feature data, so that fraud can be effectively prevented, thereby guaranteeing a high level of security.

Even if to-be-verified biometric feature data should be stolen, with a false IC card being inserted into the slot of IC card terminal 200, it is still difficult to wrongfully use the stolen public key in another system, because the key is encoded by a public key system. It is thus possible to guarantee a high level of security, realizing secure user verification.

Further, in user verification system 500 of the second embodiment, when IC card 300 receives a predetermined signal (command) via transceiving interface 301, the public key stored in IC card-dedicated public key register section 312 is read out and is then sent out to an external apparatus. Thus, it is possible for IC card terminal 200 to use the public key stored in IC card 300 in encryption, with no necessity for IC card terminal 200 to store any public key for IC card 300.

The foregoing description of the second embodiment was made on a case where a portable electronic device is an IC card, and a data processing device is an IC card terminal. The present invention should by no means be limited to this, and it is also applicable to other technical fields, such as automatic teller machines (ATMs), credit card terminals, and PC access-managing systems.

Figure 11:
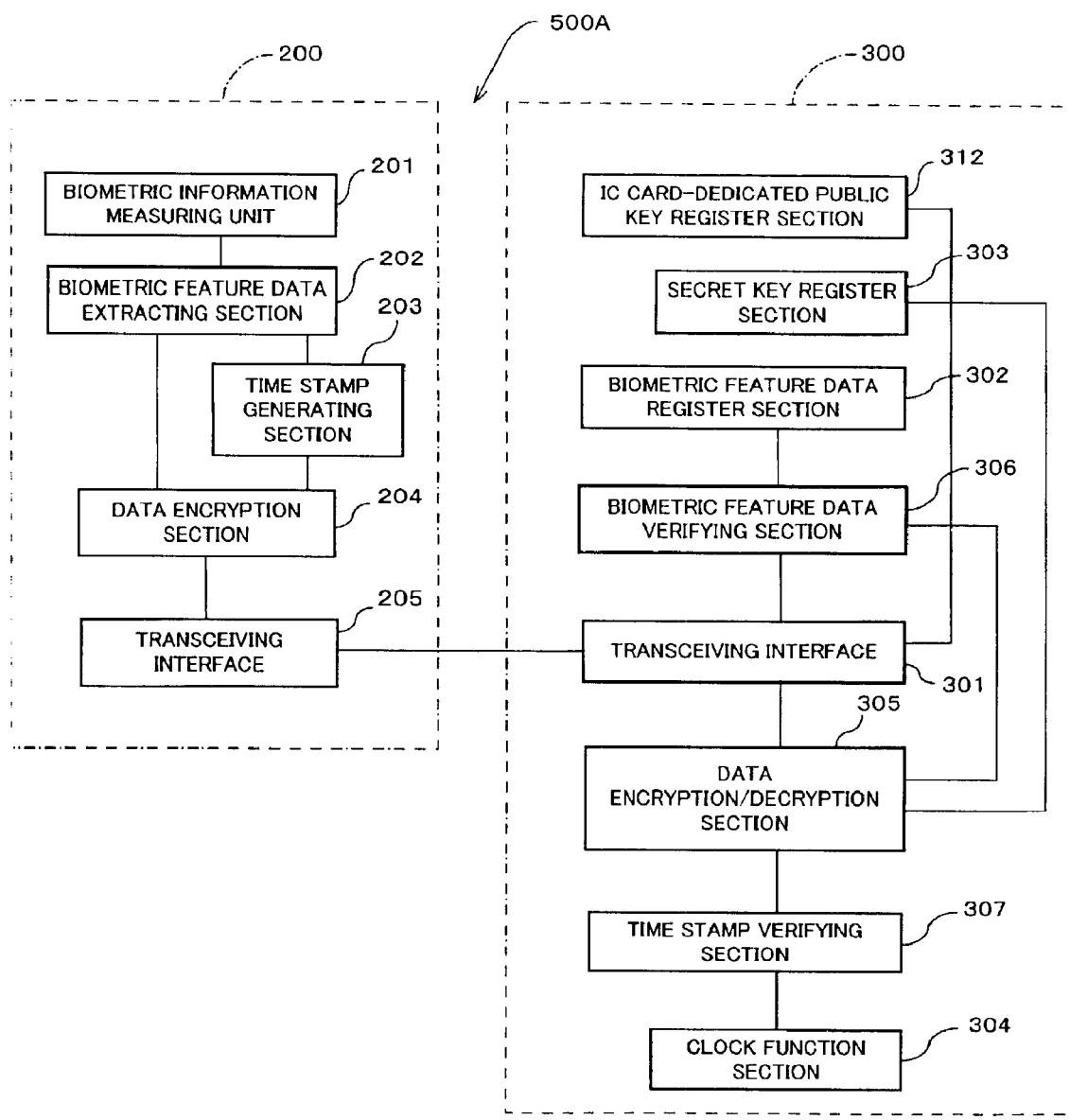
FIG. 11 is a block diagram schematically showing a structure of a user verification system of a first modified example of the second embodiment.

[2-1] First Modified Example of the Second Embodiment:

FIG. 11 is a block diagram showing a structure of a user verification system according to a first modification to the second embodiment of the present invention. Like reference numbers designate similar parts or elements throughout several views of the present embodiment, so their detailed description is omitted here.

As shown in FIG. 11, in user verification system 500A of the first modification of the second embodiment, the following functions are added to IC card terminal 200 and IC card 300 of user verification system 500 of FIG. 9.

IC card terminal 200 has time stamp generating section 203 which generates a time stamp as the date and time biometric feature data extracting section 202 extracted the to-be-verified biometric feature data. Data encryption section 204 then encodes the to-be-verified biometric feature data, which has been extracted by biometric feature data extracting section 202, along with the time stamp (the date and time the to-be-verified biometric feature data was extracted; herein after called the "verification date-and-time") which has been generated by time stamp generating section 203, using a public key for IC card 300. Transceiving interface 205 sends out the to-be-verified biometric feature data, which has been encoded in a state that a time stamp is attached thereto.

IC card 300 has clock function section 304 and time stamp verifying section 307. The functions of these clock function section 304 and time stamp verifying section 307 are, in practical use, realized by a CPU built in IC card 300.

Clock function section 304 calculates the current time. Time stamp verifying section 307 compares the time stamp restored by data encryption/decryption section 305 with the current time calculated by clock function section 304, and then evaluates whether or not the difference therebetween falls within a predetermined range (e.g., a predetermined value or smaller).

Referring now to the flowchart of FIG. 12, a description will be made hereinbelow of an operation of user verification system 500A of the first modification to the second embodiment. Like step numbers designate the same processing as in FIG. 2, so their detailed description is omitted here. As is apparent from the comparison between FIG. 2 and FIG. 12, the operation in the first modification of the second embodiment is nearly the same as the operation in the first embodiment, except that the outputting of the verification results (user number and PIN) (step S21) is not executed in the first modification of the second embodiment.

A user (object person to be verified) puts the IC card 300 into the slot of IC card terminal 200, and then presses his fingertip to a fingerprint input screen, if his fingerprint image data is requested to be input as biometric information for use in user verification.

Biometric information measuring unit 201 of IC card terminal 200 measures the user's biometric information (fingerprint image data) (step S1). From the biometric information, biometric feature data extracting section 202 extracts to-be-verified biometric feature data, and time stamp generating section 203 generates the date and time (time stamp) the to-be-verified biometric feature data was extracted, and the time stamp is attached to the to-be-verified biometric feature data (step S12).

The to-be-verified biometric feature data, along with the time stamp attached thereto, is encoded by data encryption section 204 using a public key for IC card 300 (step S13), and is then transferred/transmitted from transceiving interface 205 to IC card 300 (step S14).

When IC card 300 receives encoded data via transceiving interface 301, data encryption/decryption section 305 restores the encoded data, using a valid secret key, into the original to-be-verified biometric feature data and time stamp (step S15). Biometric feature data verifying section 306 first compares the to-be-verified biometric feature data with the valid biometric feature data (step S16).

As a result of the comparison, if the level of correlation (the degree of the matching) between the to-be-verified biometric feature data and the valid biometric feature data is below a predetermined value (NO route of step S17), the object person is judged not to be the authorized user of the IC card 300 (step S22), and a predetermined action (for example, locking the card) is taken.

Otherwise, if the level of correlation (the degree of the matching) between the to-be-verified biometric feature data and the valid biometric feature data is a predetermined value or higher (YES route of step S17), time stamp verifying section 307 compares the time stamp restored by data encryption/decryption section 305 with the current time calculated by clock function section 304 (step S18).

As a result of the comparison, if the difference between the time stamp (the extraction date-and-time) and the current time exceeds a predetermined value (NO route of step S19), the object person is judged not to be the authorized user of the IC card 300 (step S23) and a predetermined action (for example, locking the card) is taken.

Otherwise, if the difference between the time stamp (the extraction date-and-time) and the current time is a predetermined value or lower (YES route of step S19), the object person is judged to be the authorized user of the IC card 300 (step S20). After that, IC card 300 transmits/receives data to/from IC card terminal 200 in accordance with a predetermined protocol.

In this manner, user verification system 500A of the first modification to the second embodiment guarantees similar effects and benefits to those already described in the second embodiment. Additionally, even if to-be-verified biometric feature data should be intercepted during its transmission from IC card terminal 200 to IC card 300, and even if the stolen feature data should be utilized in a replay attack against IC card 300, the difference between the time stamp (the extraction date-and-time) and the current time becomes significant. On the basis of such significant difference, it is possible to reject access attempts using such stolen to-be-verified biometric feature data, so that the security level of the system is significantly improved.

Hence, as described in the first embodiment, if the stolen to-be-verified biometric feature data is used in a replay attack against IC card 300, the difference between the date and time the to-be-verified biometric feature data was extracted and the current time inevitably becomes significant. Taking advantage of this fact, user verification system 500A of the first modification to the second embodiment compares the date and time the to-be-verified biometric feature data was extracted (time stamp) with the current time. Access attempts made by using the to-be-verified biometric feature data are rejected if the difference between the time stamp (extraction date-and-time) and the current time is significantly great. It is thus difficult to use the stolen to-be-verified biometric feature data in a replay attack, thereby guaranteeing a high level of security.

Figure 13:
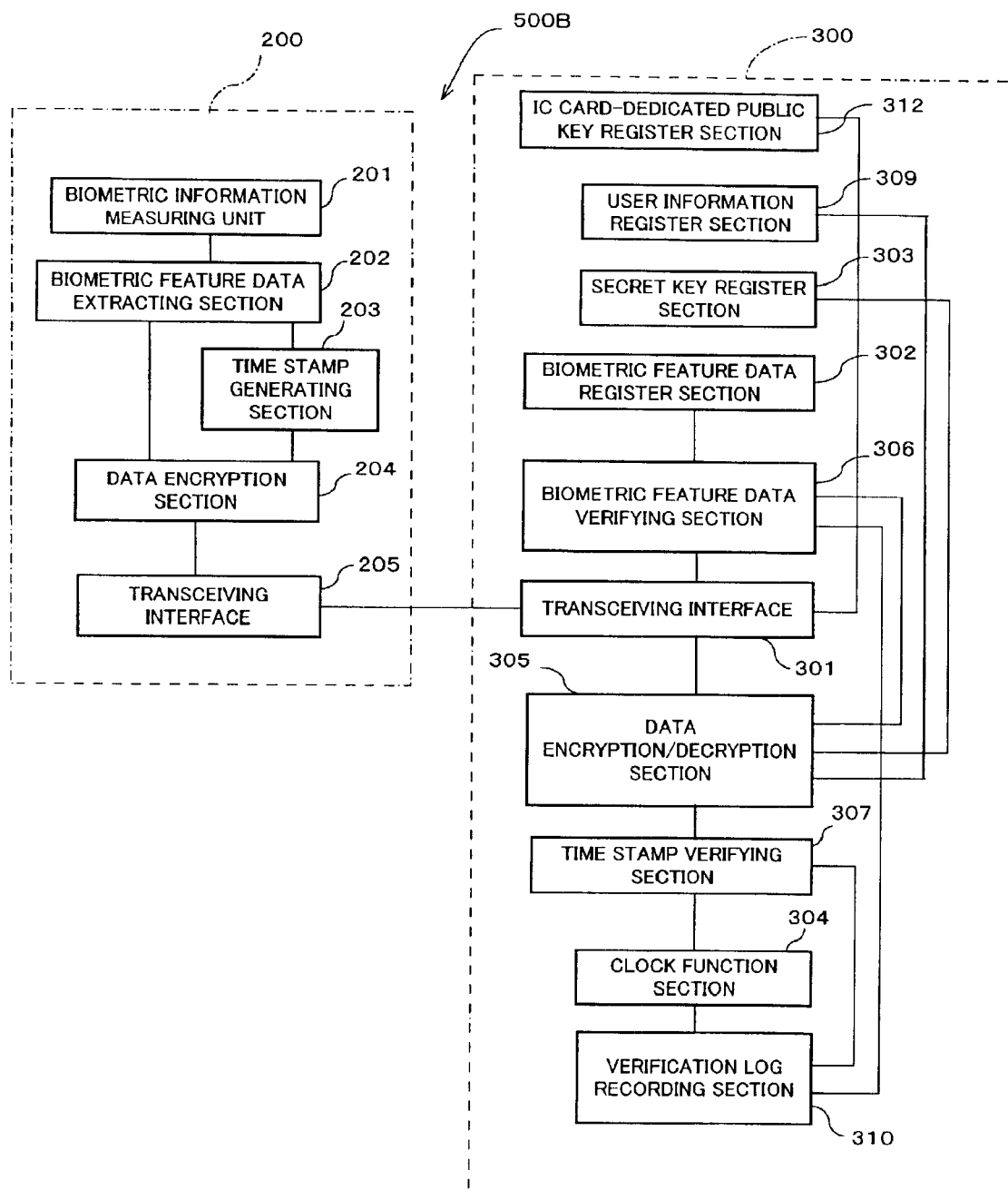
FIG. 13 is a block diagram schematically showing a structure of a user verification system of a second modified example of the second embodiment.

[2-2] Second Modified Example of the Second Embodiment:

FIG. 13 is a block diagram showing a structure of a user verification system according to a second modification to the second embodiment of the present invention. Like reference numbers designate similar parts or elements throughout several views of the present embodiment, so their detailed description is omitted here.

As shown in FIG. 13, in user verification system 500B of the second modification of the second embodiment, the following functions are added to IC card 300 of user verification system 500A of FIG. 11.

In user verification system 500B, some contrivance is made in the transmission of the verification results from IC card 300 to IC card terminal 200, which transmission is carried out after the object user is judged to be the authorized user of IC card 300 (following step S20) in the foregoing user verification system 500, 500A.

IC card 300 of the second modification to the second embodiment thus includes user information register section 309 and verification log recording section 310. These user information register section 309 and verification log recording section 310 are, in practical use, realized by a storage unit, such as a ROM and a RAM, built in IC card 300.

Here, user information register section 309 has pre-stored user information such as an account number, a bank account number, and a user number.

As in the case of the first embodiment, verification log recording section 310 holds a verification log for a limited time period. The verification log contains the results of the verification carried out by biometric feature data verifying section 306 and time stamp verifying section 307, and also the verification date-and-time obtained by clock function section 304.

Data encryption/decryption section 305 of user verification system 500B encodes the data to be transmitted to IC card terminal 200, along with the time stamp (the verification date-and-time), using a valid secret key for IC card terminal 200 stored in secret key register section 303.

Figure 14:
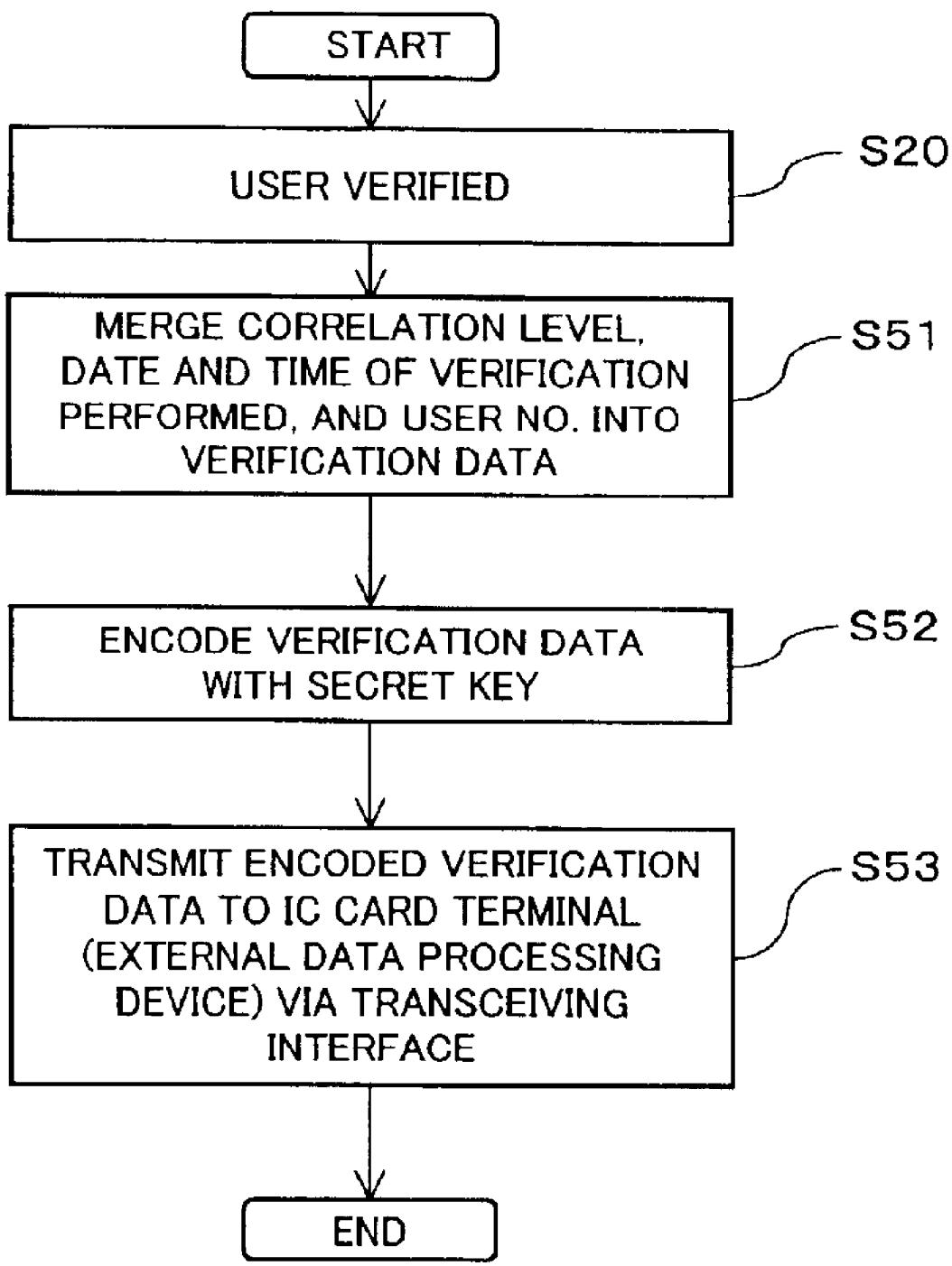
FIG. 14 is a flowchart indicating an operation of the second modified example of the second embodiment.

Referring now to the flowchart of FIG. 14, a description will be made hereinbelow of an operation of user verification system 500B of the second modification to the second embodiment.

Figure 10:
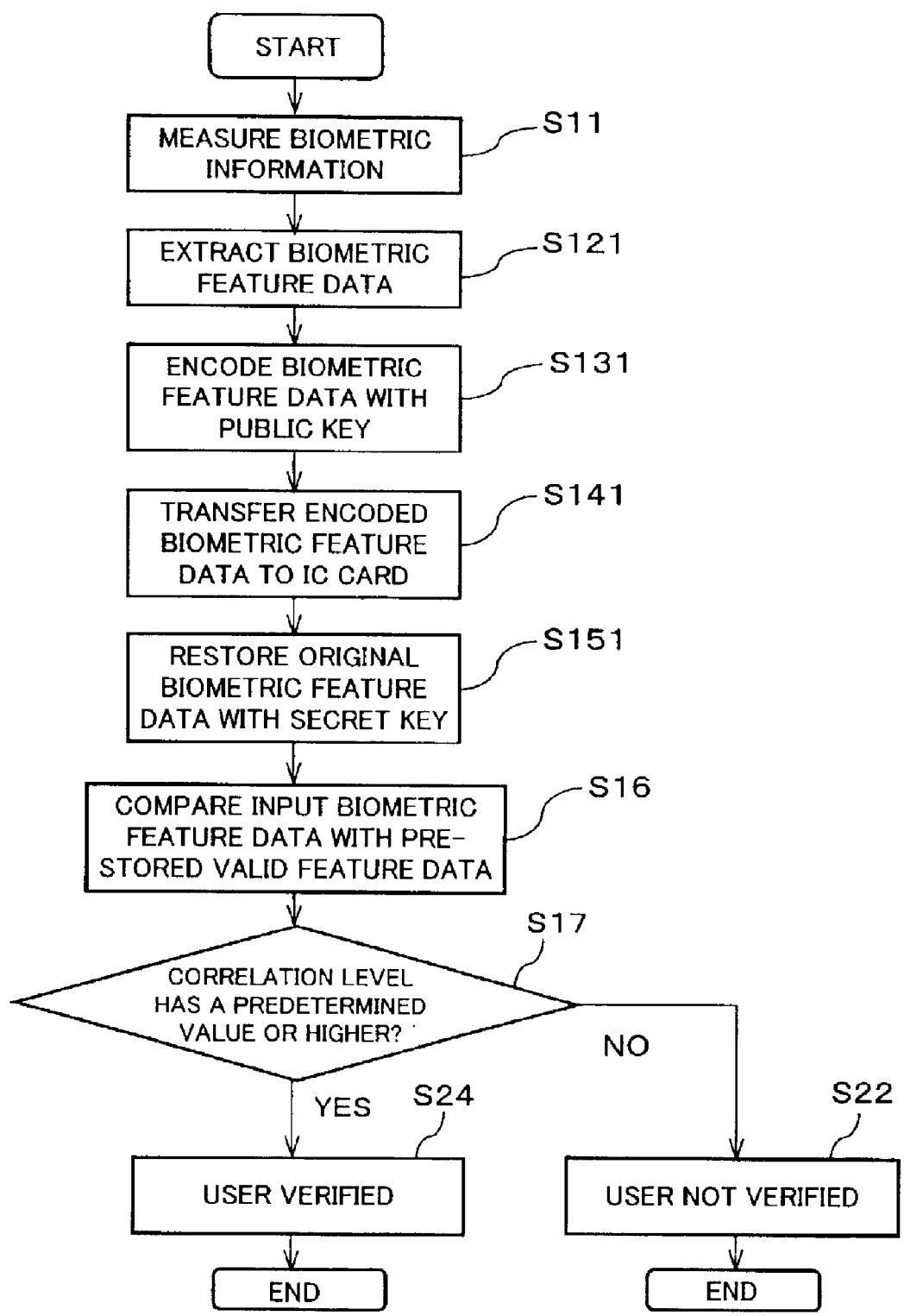
FIG. 10 is a flowchart indicating an operation of the second embodiment.
Figure 12:
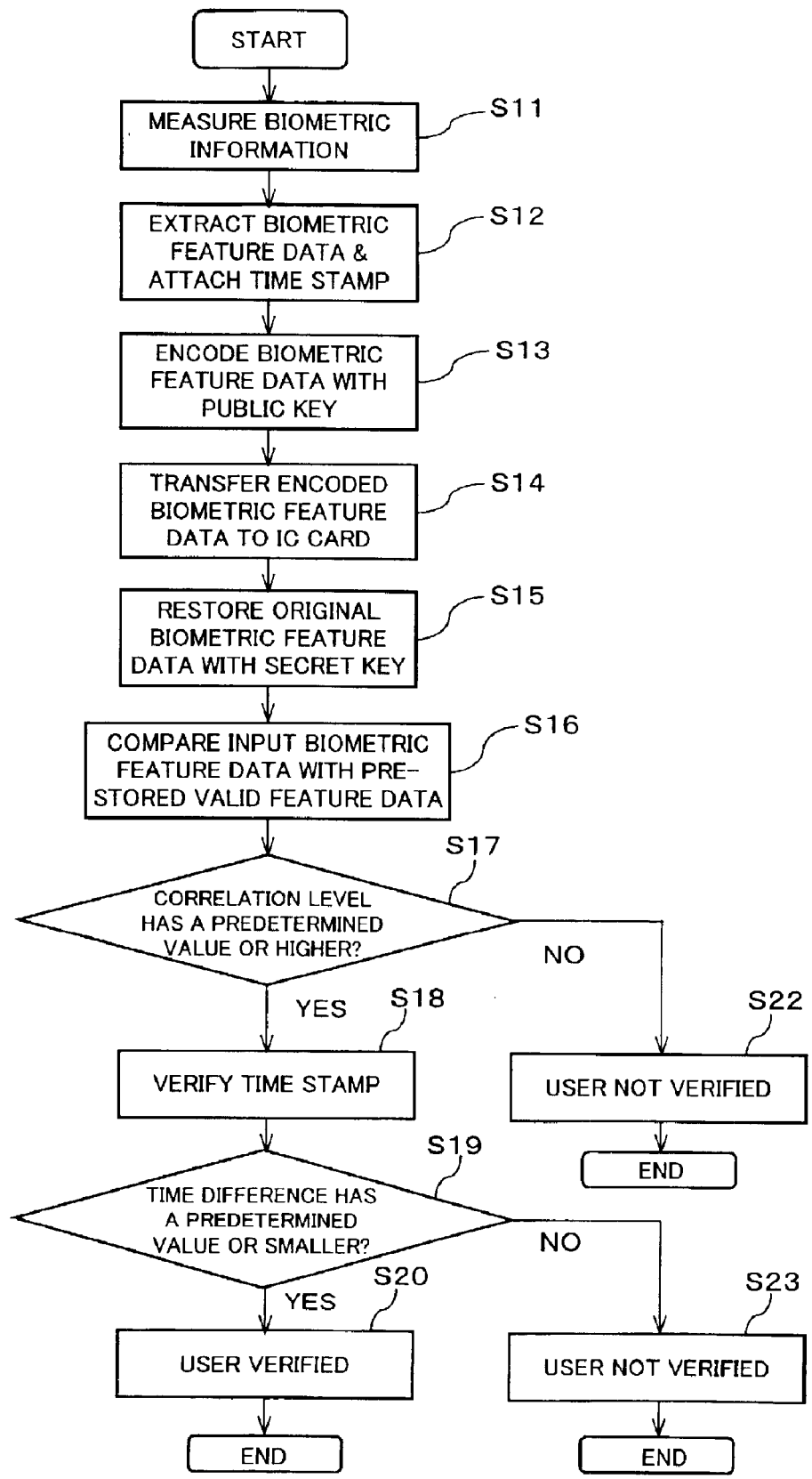
FIG. 12 is a flowchart indicating an operation of the first modified example of the second embodiment.

In user verification system 500B, after the object user is judged to be the authorized user of IC card 300, following the flowchart of FIG. 10 or FIG. 12, that is, after step S20, the following are merged as verification data (verification results) (step S51) (1) user information, such as user number, stored in user information register section 309; (2) the level of correlation between to-be-verified biometric feature data and valid biometric feature data, which correlation level has been obtained by biometric feature data verifying section 306; and (3) the verification date-and-time obtained by clock function section 304.

After that, data encryption/decryption section 305 encodes the verification data using the valid secret key stored in secret key register section 303 (step S52), and the encoded data is then sent out from transceiving interface 301 to IC card terminal 200 (step S53).

Also in the second embodiment, verification log recording section 310 of IC card 300 stores a verification log for a predetermined time period. The verification log involves the verification results ("OK"/"NG") obtained by biometric feature data verifying section 306 and time stamp verifying section 307, and the verification date-and-time obtained by clock function section 304. As such a verification log, the verification data which has been generated (merged) in step S51 may be stored in verification log recording section 310.

In this manner, user verification system 500B of the second modification of the second embodiment guarantees similar effects and benefits to those already described in the first modification of the second embodiment. Additionally, the verification result to be provided is not a simple "OK" or "NG" signal, but the following are provided after their being encoded with the valid secret key stored within IC card 300: user information; the level of correlation between to-be-verified biometric feature data and valid biometric feature data; and the verification date-and-time. The encoded data is sent out to IC card terminal 200 via transceiving interface 301.

In other words, the verification result to be sent out is the information more complicated than the simple "OK"/"NG" signal, and the information is encoded using the secret key before it is sent out. It thus becomes difficult to tamper with such complicated information, in comparison with the simple "OK"/"NG" signal. In addition, the issuer of the verification result can be certified. Further, the verification date-and-time (time stamp) is inserted into the verification result, making it difficult to use the verification result in another system. It is thus possible to surely prevent the result of verification of biometric feature data from being tampered with or falsified.

Accordingly, even when the result of the verification of biometric feature data, obtained within IC card 300, is sent out to an external apparatus, a high level of security can be guaranteed, thus realizing safe user verification. At that time, since the level of correlation between the to-be-verified biometric feature data and the valid biometric feature data is provided as a verification result, it is possible to manage the record of with what degree of certainty the user authentication was established.

Further, in user verification system 500B, verification log recording section 310 of IC card 300 stores the verification results (OK/NG) obtained by biometric feature data verifying section 306 and time stamp verifying section 307, and it also holds the result of the merging in step S51 for a predetermined time period. Thus, a record of the user verification performed is stored in IC card 300.

Figure 15:
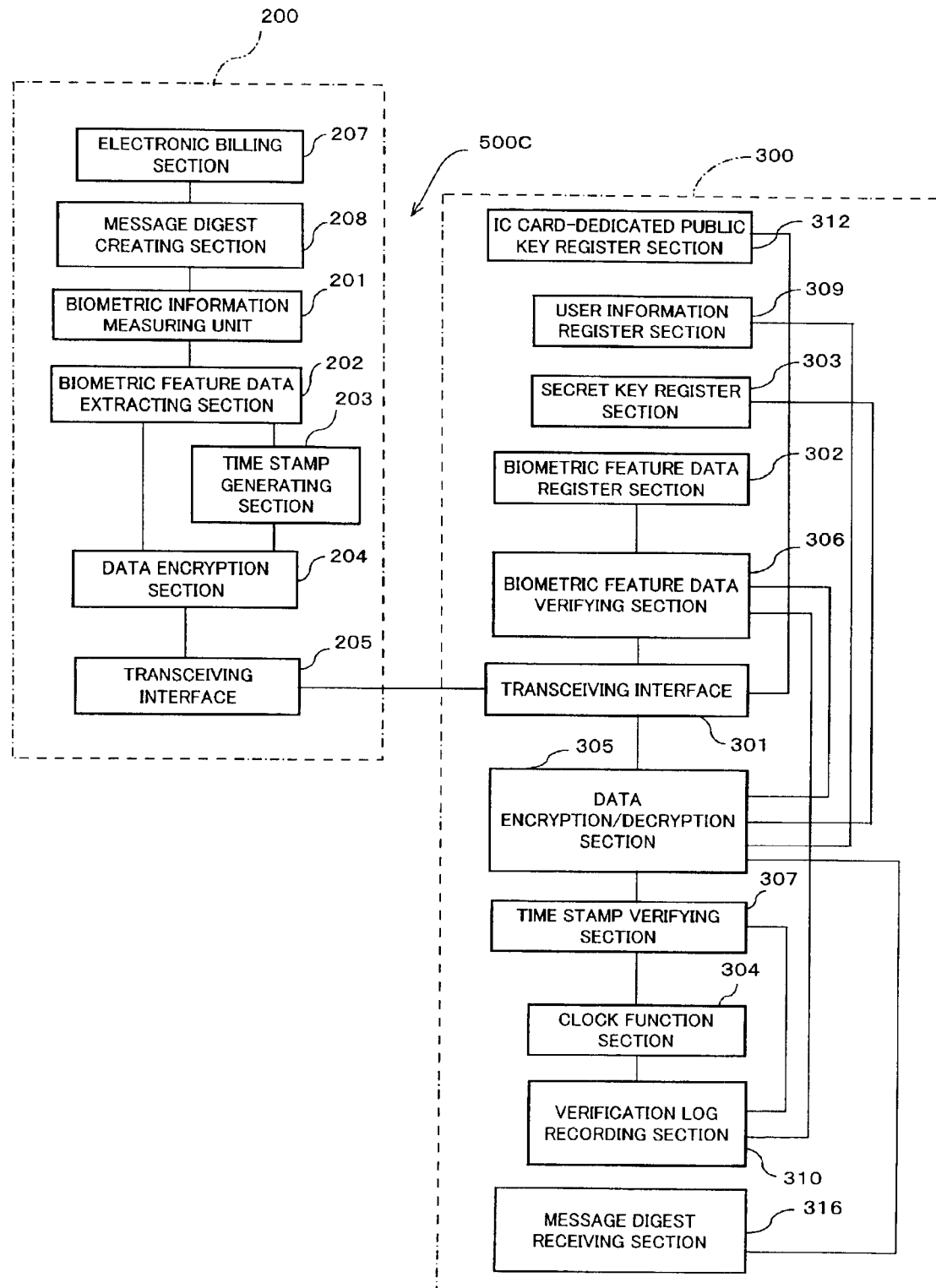
FIG. 15 is a block diagram schematically showing a structure of a user verification system of a third modified example of the second embodiment.

[2-3] Third Modified Example of the Second Embodiment:

FIG. 15 is a block diagram showing a structure of a user verification system according to a third modification to the second embodiment of the present invention. Like reference numbers designate similar parts or elements throughout several views of the present embodiment, so their detailed description is omitted here.

As shown in FIG. 15, in user verification system 500C of the third modification to the second embodiment, the following functions are added to IC card terminal 200 and IC card 300 of user verification system 500B of FIG. 13.

More precisely, IC card terminal 200 includes electronic billing section 207 and message digest creating section 208.

Electronic billing section 207 creates an electronic bill (transfer data) to be attached to to-be-verified biometric feature data, when the to-be-verified biometric feature data is sent out to IC card 300. Message digest creating section 208 generates a message digest, a value which is obtained by inputting the electronic bill (transfer data) created by electronic billing section 207 into a predetermined one-way function.

The message digest, which has been created by message digest creating section 208, is encoded by data encryption section 204 together with the to-be-verified biometric feature data, and is then transmitted from transceiving interface 205 to IC card 300.

Further, IC card 300 has a function of message digest receiving section 316. Message digest receiving section 316 receives a message digest that is restored by data encryption/decryption section 305.

Referring now to the flowchart of FIG. 16, a description will be made hereinbelow of an operation of user verification system 500C of the thrid modification to the second embodiment.

In user verification system 500C, after an object user is verified following the flowchart of FIG. 10 or FIG. 12, that is, after step S20, the following are merged as verification data (verification results) (step S61): (1) user information, such as user number, stored in user information register section 309; (2) the level of correlation between to-be-verified biometric feature data and valid biometric feature data, which correlation level has been obtained by biometric feature data verifying section 306; (3) verification date-and-time obtained by clock function section 304; and (4) a message digest received by message digest receiving section 316.

After that, data encryption/decryption section 305 encodes the verification data using the valid secret key stored in secret key register section 303 (step S62), and the encoded data is then sent out from transceiving interface 301 to IC card terminal 200 (step S63).

Here, in step S61, the foregoing data of (1) through (4) may further be merged with another message digest newly generated within IC card 300 and with the date and time the transaction permission was given to this message digest.

In this manner, user verification system 500C of the third modification of the second embodiment guarantees similar effects and benefits to those already described in the second modification of the second embodiment. Additionally, since a message digest is transmitted to IC card terminal 200 as a verification result, it is possible to manage a record of which transaction the verification was made for.

In step S61, the foregoing data of (1) through (4) may further be merged with another message digest newly generated within IC card 300 and with the date and time the transaction permission was given to this message digest. In this case, it is possible to reduce the possibility with further reliability that verification results are tampered with or falsified.

[3] Other Modifications:

The second embodiment, as in the third modification of the first embodiment, may include verification counter section 313 and IC card lock section 314. If biometric feature data verifying section 306 obtains the comparison result a predetermined times consecutively that a matching condition between the to-be-verified biometric feature data and the valid biometric feature data is not satisfied, IC card lock section 314 locks IC card 300 to prohibit the inputting of biometric feature data to IC card 300, thereby preventing unauthorized accessing with reliability.

In the foregoing embodiments, the description was made on the cases where a portable electronic device is an IC card. The present invention should by no means be limited to the above-illustrated embodiments, and various changes or modifications may be suggested without departing from the gist of the invention. For example, any other type of portable electronic device (optical cards, radio communication cards, and so on) is also applicable which has a built-in storage unit and CPU, and which has a function for performing biometric user verification/authentication. With such an electronic device, like effects and benefits to those which have already been described above are also guaranteed.

Industrial Applicability

According to the present invention, user verification with biometric feature data is performed on a portable electronic device. If the user is judged to be the authorized user of the portable electronic device, a PIN is transmitted from the portable electronic device to a management device. In this manner, since PIN verification is associated with biometric user verification utilizing biometric information, which is free of being stolen or faked, it is possible to surely prevent the leakage and the theft of the PIN, so that a high level of security can be guaranteed, thereby realizing secure user verification.

Consequently, the present invention is suitable for use in a system where a PIN should be input as verification, such as a debit card system, and the usefulness of the present invention is extremely high.

What is claimed is:

1. A user verification system, comprising:
   a portable electronic device, which is adapted to be carried by a user with a function as a debit card;
   a data processing device for directly accessing such portable electronic device, temporarily installed therein, so as to function as a debit card terminal for the portable electronic device; and
   a management device installed in a bank to serve as a host computer that manages the user's bank account from which payment for a purchase made with the portable electronic device, as the debit card, is withdrawn, said managing device accessing said portable electronic device via said data processing device and verifying said user utilizing a personal identification number (PIN), said data processing device including:
- a biometric information measuring unit for measuring biometric information of said user;
- a biometric feature data extracting section for extracting to-be-verified biometric feature data from said biometric information, which has been measured by biometric information measuring unit; and
- a first transceiving interface for transmitting/receiving data to/from said portable electronic device and said management device, said portable electronic device including:
- a biometric feature data register section having pre-stored valid biometric feature data of an authorized user of said portable electronic device;
- a second transceiving interface for transmitting/receiving data to/from said data processing device;
- a biometric feature data verifying section for comparing to-be-verified biometric feature data, which is received from said data processing device via said second transceiving interface, with said pre-stored valid biometric feature data; and
- a PIN register section having a pre-stored PIN of said authorized user of said portable electronic device, said to-be-verified biometric feature data being transmitted from said first transceiving interface of said data processing device to said portable electronic device, said biometric feature data verifying section of said portable electronic device comparing said to-be-verified biometric feature data, which has been received via said second transceiving interface, with said pre-stored valid biometric feature data, and as the result of the comparison, if said to-be-verified biometric feature data matches said pre-stored valid biometric feature data in terms of a predetermined matching condition, said PIN being transmitted from said second transceiving interface of said portable electronic device to said management device via said first transceiving interface of said data processing device.

2. The user verification system according to claim 1, wherein said data processing device further includes a first encryption section for encoding said to-be-verified biometric feature data with a public key, wherein said portable electronic device further includes:
- a secret key register section having a pre-stored valid secret key corresponding to said public key; and
- a decryption section for decoding encoded data, which is received from said data processing device via said second transceiving interface, with said valid secret key, wherein said to-be-verified biometric feature data encoded by said first encryption section is transmitted from said first transceiving interface to said portable electronic device, as said encoded data, and wherein said decryption section decodes said encoded data, which has been received via said second transceiving interface, into the original to-be-verified biometric feature data, which is then compared with said pre-stored valid biometric feature data by said biometric feature data verifying section.

3. The user verification system according to claim 1, wherein said portable electronic device further includes:
- a made-for-management-device public key register section having a pre-stored public key dedicated to said management device; and
- an encryption section for encoding said PIN with said made-for-management-device public key before said PIN is sent out to said management device.

4. The user verification system according to claim 1, wherein said portable electronic device further includes a recording unit provided on its surface, said recording unit storing magnetic data on information for use in processing carried out by said management device, wherein said data processing device further includes a magnetic data read-out unit for reading out said magnetic data stored in said recording unit, and wherein said magnetic data, which has been readout by said magnetic data read-out unit, is sent out, together with said PIN, from said first transceiving interface to said management device.

5. The user verification system according to claim 1, wherein upon receipt of a predetermined signal via said second transceiving interface, said portable electronic device transmits public key information of said authorized user, which public key information is registered in said portable electronic device, from said second transceiving interface to said data processing device.

6. The user verification system according to claim 1, further comprising a lock function section which is operable to prohibit input of biometric feature information to said portable electronic device, if the evaluation is made a predetermined number of times successively, as a result of the comparison by said feature data verifying section of said portable electronic device, that said to-be-verified biometric feature data never matches said pre-stored valid biometric feature data in terms of said predetermined matching condition.

7. The user verification system according to claim 1, wherein said portable electronic device further includes a management log recording section storing a management log of said PIN, said management log accumulating the dates and times when said PIN has been transmitted, or the descriptions of transactions performed, or both of these.

8. A user verification system comprising:
- a portable electronic device, which is adapted to be carried by a user with a function as a debit card;
- a data processing device for directly accessing such portable electronic device, temporarily installed therein, so as to function as a debit card terminal for the portable electronic device; and
- a management device installed in a bank to serve as a host computer that manages the user's bank account from which payment for a purchase made with the portable electronic device, as the debit card, is withdrawn, said managing device accessing said portable electronic device via said data processing device and verifying said user utilizing a personal identification number (PIN), said data processing device including:
- a biometric information measuring unit for measuring biometric information of said user;
- a biometric feature data extracting section for extracting to-be-verified biometric feature data from said biometric information, which has been measured by biometric information measuring unit; and
- a first transceiving interface for transmitting/receiving data to/from said portable electronic device and said management device, said portable electronic device including:
- a biometric feature data register section having pre-stored valid biometric feature data of an authorized user of said portable electronic device;
- a second transceiving interface for transmitting/receiving data to/from said data processing device;
- a biometric feature data verifying section for comparing to-be-verified biometric feature data, which is received from said data processing device via said second transceiving interface, with said pre-stored valid biometric feature data; and
- a PIN register section having a pre-stored PIN of said authorized user of said portable electronic device, said to-be-verified biometric feature data being transmitted from said first transceiving interface of said data processing device to said portable electronic device, said biometric feature data verifying section of said portable electronic device comparing said to-be-verified biometric feature data, which has been received via said second transceiving interface, with said pre-stored valid biometric feature data, and as the result of the comparison, if said to-be-verified biometric feature data matches said pre-stored valid biometric feature data in terms of a predetermined matching condition, said PIN being transmitted from said second transceiving interface of said portable electronic device to said management device via said first transceiving interface of said data processing device, wherein said data processing device further includes a time stamp generating section for generating a time stamp as the date and time when said biometric feature data extracting section has extracted said to-be-verified biometric feature data, wherein, said time stamp is encoded, together with said to-be-verified biometric feature data, and the encoded time stamp is then sent out from said first transceiving interface to said portable electronic device, wherein said portable electronic device further includes:
- a clock function section for calculating the current time; and
- a time stamp verifying section for comparing the original time stamp, which has been restored by a decryption section, with said current time, which has been calculated by said clock function section, and wherein, if it is found, as the comparison result by said biometric feature data verifying section, that said to-be-verified biometric feature data matches said pre-stored valid biometric feature data in terms of a predetermined matching condition, and also if it is found, as the comparison result by said time stamp verifying section, that a difference between said time stamp and said current time falls within a predetermined range, said user is identified as said authorized user of said portable electronic device to transmit the PIN to said management device.

9. The user verification system according to claim 8, wherein if said user is identified as said authorized user of said portable electronic device, as the comparison result by said biometric feature data verifying section and said time stamp verifying section, an encryption section encodes both said PIN and the date and time of the comparison performed, which date and time is obtained by said clock function section, and the encoded PIN and the encoded date and time of the comparison are then sent out from said second transceiving interface of said portable electronic device to said management device via said first transceiving interface of said data processing device.

10. A portable electronic device with a user verification function utilizing biometric information, which device is for use in a user verification system that includes the portable electronic device, adapted to be carried by a user, with a function as a debit card; a data processing device for directly accessing such portable electronic device, temporarily installed therein, so as to function as a debit card terminal for the portable electronic device; a management device installed in a bank to serve as a host computer that manages the user's bank account from which payment for a purchase made with the portable electronic device, as the debit card, is withdrawn, said managing device accessing said portable electronic device via said data processing device and verifying said user utilizing a person identification unit number (PIN), said portable electronic device comprising:
- a biometric feature data register section having pre-stored valid biometric feature data of an authorized user of said portable electronic device;
- a transceiving interface for transmitting/receiving data to/from said data processing device;
- a biometric feature data verifying section for comparing to-be-verified biometric feature data, which is received from said data processing device via said transceiving interface, with said pre-stored valid biometric feature data; and
- a PIN register section having a pre-stored PIN of said authorized user of said portable electronic device, said biometric feature data verifying section comparing said to-be-verified biometric feature data, which has been received via said transceiving interface, with said pre-stored valid biometric feature data, and as the result of the comparison, if said to-be-verified biometric feature data matches said pre-stored valid biometric feature data in terms of a predetermined matching condition, said PIN being transmitted from said transceiving interface to said management device via said data processing device.

11. The portable electronic device according to claim 10, further comprising:
- a secret key register section having a pre-stored valid secret key corresponding to said public key; and
- a decryption section for decoding encoded data, which is received from said processing device via said second transceiving interface, with said valid secret key, said decryption section decoding said encoded data, which has been received via said transceiving interface, into the original to-be-verified biometric feature data, and said biometric feature data verifying section comparing the original to-be-verified biometric feature data, which has been restored by said decryption section, with said pre-stored valid biometric feature data.

12. The portable electronic device according to claim 10, further comprising:
- a made-for-management-device public key register section having a pre-stored public key dedicated to said management device; and
- an encryption section for encoding said PIN with said made-for-management-device public key before said PIN is sent out to said management device.

13. The portable electronic device according to claim 10, further comprising a recording unit provided on its surface, said recording unit storing magnetic data on information for use in processing which is carried out by said management device.

14. The portable electronic device according to claim 10, wherein upon receipt of a predetermined signal via said transceiving interface, said portable electronic device transmits public key information of said authorized user, which public key information is registered in said portable electronic device, from said transceiving interface to said processing device.

15. The portable electronic device according to claim 10, further comprising a lock function section which is operable to prohibit input of biometric feature information to said portable electronic device, if the evaluation is made a predetermined number of times successively, as a result of the comparison by said feature data verifying section, that said to-be-verified biometric feature data never matches said pre-stored valid biometric feature data in terms of said predetermined matching condition.

16. The portable electronic device according to claim 10, further comprising a management log recording section storing a management log of said PIN, said management log accumulating the dates and times when said PIN has been transmitted, or descriptions of transactions performed, or both of these.

17. A portable electronic device with a user verification function utilizing biometric information, which device is for use in a user verification system that includes the portable electronic device, adapted to be carried by a user, with a function as a debit card; a data processing device for directly accessing such portable electronic device, temporarily installed therein, so as to function as a debit card terminal for the portable electronic device; a management device installed in a bank to serve as a host computer that manages the user's bank account from which payment for a purchase made with the portable electronic device, as the debit card, is withdrawn, said managing device accessing said portable electronic device via said data processing device and verifying said user utilizing a person identification unit number (PIN), said portable electronic device comprising:

a biometric feature data register section having pre-stored valid biometric feature data of an authorized user of said portable electronic device;

a transceiving interface for transmitting/receiving data to/from said data processing device;

a biometric feature data verifying section for comparing to-be-verified biometric feature data, which is received from said data processing device via said transceiving interface, with said pre-stored valid biometric feature data; and a PIN register section having a pre-stored PIN of said authorized user of said portable electronic device, said biometric feature data verifying section comparing said to-be-verified biometric feature data, which has been received via said transceiving interface, with said pre-stored valid biometric feature data, and as the result of the comparison, if said to-be-verified biometric feature data matches said pre-stored valid biometric feature data in terms of a predetermined matching condition, said PIN being transmitted from said transceiving interface to said management device via said data processing device, a clock function section for calculating the current time; and a time stamp verifying section for comparing a time stamp, if any, attached to the original to-be-verified biometric feature data, with said current time, which has been calculated by said clock function section, said time stamp indicating the date and time when said to-be-verified biometric feature data has been extracted, if it is found, as the comparison result by said biometric feature data verifying section, that said to-be-verified biometric feature data matches said pre-stored valid biometric feature data in terms of a predetermined matching condition, and also if it is found, as the comparison result by said time stamp verifying section, that a difference between said time stamp and said current time falls within a predetermined range, said user being identified as said authorized user of said portable electronic device to transmit the PIN to the management device.

18. The portable electronic device according to claim 17, wherein if said user is identified as said authorized user of said portable electronic device, as the comparison result by said biometric feature data verifying section and said time stamp verifying section, an encryption section encodes both said PIN and the date and time of the comparison performed, which date and time is obtained by said clock function section, and the encoded PIN and the encoded date and time of the comparison are then sent out from said transceiving interface to said management device.

19. A user verification system, comprising:

a portable electronic device, adapted to be carried by a user, with a function as a debit card;

a data processing device for directly accessing such portable electronic device, temporarily installed therein, so as to function as a debit card terminal for the portable electronic device; and a management device installed in a bank to serve as a host computer that manages the user's bank account from which payment for a purchase made with the portable electronic device, as the debit card, is withdrawn, said managing device accessing said portable electronic device via said data processing device and verifying said user utilizing a personal identification number (PIN), said data processing device including:

a biometric information measuring unit for measuring biometric information of said user;

a biometric feature data extracting section for extracting to-be-verified biometric feature data from said biometric information, which has been measured by biometric information measuring unit;

a first encryption section for encoding said to-be-verified biometric feature data with a public key; and a first transceiving interface for transmitting/receiving data to/from said portable electronic device, said portable electronic device including:

a biometric feature data register section having pre-stored valid biometric feature data of an authorized user of said portable electronic device;

a second transceiving interface for transmitting/receiving data to/from said data processing device;

a biometric feature data verifying section for comparing to-be-verified biometric feature data, which is received from said data processing device via said second transceiving interface, with said pre-stored valid biometric feature data;

a secret key register section having a pre-stored valid secret key corresponding to said public key; and a decryption section for decoding encoded data, which has been encoded with said public key, with said valid secret key, the encoded to-be-verified biometric feature data, which has been encoded by said first encryption section, being transmitted from said first transceiving interface to said portable electronic device, said decryption section decoding said encoded data, which has been received via said second transceiving interface, into the original to-be-verified biometric feature data, and said biometric feature data verifying section comparing the original to-be-verified biometric feature data with said pre-stored valid biometric feature data.

20. The user verification system according to claim 19, wherein upon receipt of a predetermined signal via said second transceiving interface, said portable electronic device transmits public key information of said authorized user, which public key information is registered in said portable electronic device, from said second transceiving interface to said data processing device.

21. The user verification system according to claim 19, further comprising a lock function section which is operable to prohibit input of biometric feature information to said portable electronic device, if the evaluation is made a predetermined number of times successively, as a result of the comparison by said feature data verifying section of said portable electronic device, that said to-be-verified biometric feature data never matches said pre-stored valid biometric feature data in terms of said predetermined matching condition.

22. A user verification system, comprising:
a portable electronic device, adapted to be carried by a user, with a function as a debit card;
a data processing device for directly accessing such portable electronic device, temporarily installed therein, so as to function as a debit card terminal for the portable electronic device; and
a management device installed in a bank to serve as a host computer that manages the user's bank account from which payment for a purchase made with the portable electronic device, as the debit card, is withdrawn, said managing device accessing said portable electronic device via said data processing device and verifying said user utilizing a personal identification number (PIN).
said data processing device including:
a biometric information measuring unit for measuring biometric information of said user;
a biometric feature data extracting section for extracting to-be-verified biometric feature data from said biometric information, which has been measured by biometric information measuring unit;
a first encryption section for encoding said to-be-verified biometric feature data with a public key; and
a first transceiving interface for transmitting/receiving data to/from said portable electronic device,
said portable electronic device including:
a biometric feature data register section having pre-stored valid biometric feature data of an authorized user of said portable electronic device;
a second transceiving interface for transmitting/receiving data to/from said data processing device;
a biometric feature data verifying section for comparing to-be-verified biometric feature data, which is received from said data processing device via said second transceiving interface, with said pre-stored valid biometric feature data;
a secret key register section having a pre-stored valid secret key corresponding to said public key; and a decryption section for decoding encoded data, which has been encoded with said public key, with said valid secret key, the encoded to-be-verified biometric feature data, which has been encoded by said first encryption section, being transmitted from said first transceiving interface to said portable electronic device, said decryption section decoding said encoded data, which has been received via said second transceiving interface, into the original to-be-verified biometric feature data, and said biometric feature data verifying section comparing the original to-be-verified biometric feature data with said pre-stored valid biometric feature data, wherein said data processing device further includes a time stamp generating section for generating a time stamp as the date and time when said biometric feature data extracting section has extracted said to-be-verified biometric feature data, wherein, said time stamp is encoded, together with said to-be-verified biometric feature data, by said first encryption section, and the encoded time stamp is then sent out from said first transceiving interface to said portable electronic device, wherein said portable electronic device further includes:
a clock function section for calculating the current time; and
a time stamp verifying section for comparing the original time stamp, which has been restored by said decryption section. with said current time, which has been calculated by said clock function section, and wherein, if it is found, as the comparison result by said biometric feature data verifying section, that said to-be-verified biometric feature data matches said pre-stored valid biometric feature data in terms of a predetermined matching condition, and also if it is found, as the comparison result by said time stamp verifying section, that a difference between said time stamp and said current time falls within a predetermined range, said user is identified as said authorized user of said portable electronic device.

23. The user verification system according to claim 22, wherein said portable electronic device further includes:
a user information register section having pre-stored user information about said authorized user of said portable electronic device; and
a second encryption section for encoding data, which is to be transmitted from said second transceiving interface to said data processing device, with said valid secret key, and wherein as a result of comparison by said biometric feature data verifying section and said time stamp verifying section, if said user is identified as said authorized user of said portable electronic device, said second encryption section encodes at least one of the following items: said user information; the level of correlation between said to-be-verified biometric feature data and said pre-stored valid biometric feature data, which correlation level is obtained at the comparison; and the date and time of said comparison performed, which is provided by said clock function section, and the encoded item is sent out from said second transceiving interface to said data processing device as a verification result.

24. The user verification system according to claim 23, wherein said data processing section further includes a message digest creating section for creating a message digest as a value obtained by inputting data to be transferred to said portable electronic device to a predetermined one-way function, wherein said message digest and said to-be-verified biometric feature data are both encoded by said first encryption section, and are then sent out from said first transceiving interface to said portable electronic device, wherein if said user is identified as said authorized user of said portable electronic device, as the comparison result by said biometric feature data verifying section and said time stamp verifying section, said second encryption section encodes the message digest which has been restored by said decryption section, and the encoded message digest is sent out from said second transceiving interface to said data processing device, as a verification result.

25. The user verification system according to claim 23, wherein said portable electronic device further includes a verification log recording section storing said verification result as a verification log for a predetermined time period.

26. A portable electronic device for use in a user verification system that includes the portable electronic device, adapted to be carried by a user, with a function as a debit card; a data processing device for directly accessing such portable electronic device, temporarily installed therein, so as to function as a debit card terminal for the portable electronic device; and a management device installed in a bank to serve as a host computer that manages the user's bank account from which payment for a purchase made with the portable electronic device, as the debit card, is withdrawn, said managing device accessing said portable electronic device via said data processing device and verifying said user utilizing a personal identification number (PIN), said portable electronic device, comprising:

a biometric feature data register section having pre-stored valid biometric feature data of an authorized user of said portable electronic device;

a transceiving interface for transmitting/receiving data to/from said data processing device;

a biometric feature data verifying section for comparing to-be-verified biometric feature data, which is received from said data processing device via said transceiving interface, with said pre-stored valid biometric feature data;

a secret key register section having a pre-stored valid secret key corresponding to a public key; and a decryption section for decoding encoded data, which has been encoded with said public key, with said valid secret key, said decryption section decoding said encoded data, which has been received from said data processing device via said transceiving interface, into the original to-be-verified biometric feature data, and said biometric feature data verifying section comparing the original to-be-verified biometric feature data with said pre-stored valid biometric feature data.

27. The portable electronic device according to claim 26, wherein upon receipt of a predetermined signal via said transceiving interface, said portable electronic device transmits public key information of said authorized user, which public key information is registered in said portable electronic device, from said transceiving interface to said data processing device.

28. The portable electronic device according to claim 26, further comprising a lock function section which is operable to prohibit input of biometric feature information to said portable electronic device, if the evaluation is made a predetermined number of times successively, as the result of the comparison by said feature data verifying section, that said to-be-verified biometric feature data never matches said pre-stored valid biometric feature data in terms of said predetermined matching condition.

29. A portable electronic device for use in a user verification system that includes the portable electronic device, adapted to be carried by a user, with a function as a debit card; a data processing device for directly accessing such portable electronic device, temporarily installed therein, so as to function as a debit card terminal for the portable electronic device; and a management device installed in a bank to serve as a host computer that manages the user's bank account from which payment for a purchase made with the portable electronic device, as the debit card, is withdrawn, said managina device accessing said portable electronic device via saId data processing device and verifying said user utilizing a personal identification number (PIN), said portable electronic device, comprising:

a biometric feature data register section having pre-stored valid biometric feature data of an authorized user of said portable electronic device;

a transceiving interface for transmitting/receiving data to/from said data processing device;

a biometric feature data verifying section for comparing to-be-verified biometric feature data, which is received from said data processing device via said transceiving interface, with said pre-stored valid biometric feature data;

a secret key register section having a pre-stored valid secret key corresponding to a public key;

a decryption section for decoding encoded data, which has been encoded with said public key, with said valid secret key, said decryption section decoding said encoded data, which has been received from said data processing device via said transceiving interface, into the original to-be-verified biometric feature data, said biometric feature data verifying section comparing the original to-be-verified biometric feature data with said pre-stored valid biometric feature data;

a clock function section for calculating the current time; and a time stamp verifying section for comparing a time stamp, if any, attached to the original to-be-verified biometric feature data restored by said decryption section, with said current time, which has been calculated by said clock function section, said time stamp indicating the date and time when said to-be-verified biometric feature data has been extracted, if it is found, as the comparison result by said biometric feature data verifying section, that said to-be-verified biometric feature data matches said pre-stored valid biometric feature data in terms of a predetermined matching condition, and also if it is found, as the comparison result by said time stamp verifying section, that a difference between said time stamp and said current time falls within a predetermined range, said user being identified as said authorized user of said portable electronic device.

30. The portable electronic device according to claim 29, further comprising:

a user information register section having pre-stored user information about said authorized user of said portable electronic device; and an encryption section for encoding data, which is to be transmitted from said transceiving interface to said data processing device, with said valid secret key, as a result of comparison by said biometric feature data verifying section and said time stamp verifying section, if said user is identified as said authorized user of said portable electronic device, said encryption section encoding at least one of the following items: said user information; the level of correlation between said to-be-verified biometric feature data and said pre-stored valid biometric feature data, which correlation level is obtained at the comparison; and the date and time of said comparison performed, which is provided by said clock function section, and the encoded item being sent out from said transceiving interface to said data processing device as a verification result.

31. The portable electronic device according to claim 30, wherein if said user is identified as said authorized user of said portable electronic device, as the comparison result by said biometric feature data verifying section and said time stamp verifying section, and also if a message digest, which is obtained by inputting data to be transferred to said portable electronic device to a predetermined one-way function, is attached to the original to-be-verified biometric feature data restored by said decryption section, said encoding section encodes said message digest, and the encoded message digest is then sent out from said transceiving interface to said data processing device as a verification result.

32. The portable electronic device according to claim 30, further including a verification log recording section storing said verification results as a verification log for a predetermined time period.

* * * * *

UNITED STATES PATENT AND TRADEMARK OFFICE
CERTIFICATE OF CORRECTION

PATENT NO. : 6,957,339 B2  Page 1 of 1
APPLICATION NO. : 10/163531
DATED : October 18, 2005
INVENTOR(S) : Takashi Shinzaki It is certified that error appears in the above-identified patent and that said Letters Patent is hereby corrected as shown below:

Title page, Col. 2
Primary Examiner
Delete "Avaz" and insert ---Ayaz--.

Col. 43, line 43, after "(PIN)" delete "." and insert --,--, therefor.

Col. 44, line 30, delete "section." and insert --section,--, therefor.

Col. 46, line 20, delete "managina" and insert --managing--, therefor.

Col. 46, line 21, delete "sald" and insert --said--, therefor.

Signed and Sealed this

Twenty-fifth Day of July, 2006

JON W. DUDAS
*Director of the United States Patent and Trademark Office*